(12) United States Patent
Medina-Garcia et al.

(10) Patent No.: US 12,218,597 B2
(45) Date of Patent: Feb. 4, 2025

(54) CROSS CONDUCTION PROTECTION IN A VOLTAGE CONVERTER

(71) Applicant: Infineon Technologies Austria AG, Villach (AT)

(72) Inventors: Alfredo Medina-Garcia, Munich (DE); Martin Krueger, Oberschleißheim (DE)

(73) Assignee: Infineon Technologies Austria AG, Villach (AT)

( * ) Notice: Subject to any disclaimer, the term of this patent is extended or adjusted under 35 U.S.C. 154(b) by 99 days.

(21) Appl. No.: 17/712,490

(22) Filed: Apr. 4, 2022

(65) Prior Publication Data

US 2023/0318462 A1    Oct. 5, 2023

(51) Int. Cl.
*H02M 3/335* (2006.01)
*H02M 1/38* (2007.01)
*H02M 3/00* (2006.01)

(52) U.S. Cl.
CPC ......... *H02M 3/33569* (2013.01); *H02M 1/38* (2013.01); *H02M 3/01* (2021.05); *H02M 3/33571* (2021.05)

(58) Field of Classification Search
CPC .... H02M 3/01; H02M 3/335; H02M 3/33507; H02M 3/33569; H02M 3/33571; H02M 1/38
See application file for complete search history.

(56) References Cited

U.S. PATENT DOCUMENTS

| | | |
|---|---|---|
| 2016/0087543 A1 | 3/2016 | Jin et al. |
| 2017/0077821 A1* | 3/2017 | Namekawa ....... H02M 3/33571 |
| 2020/0169160 A1 | 5/2020 | Kikuchi et al. |

OTHER PUBLICATIONS

Extended Search Report, EP 23 16 3528, Jul. 19, 2023, pp. 1-8.

\* cited by examiner

*Primary Examiner* — Gary L Laxton
(74) *Attorney, Agent, or Firm* — Armis IP Law, LLC

(57) ABSTRACT

A power supply includes a controller. The controller controls switching of a first switch and a second switch in a power supply to regulate conveyance of energy from a primary winding of a transformer to a secondary winding of the transformer to generate an output voltage. To control generation of the output voltage, the controller receives a first signal generated at a first node coupling the first switch and the second switch. As discussed herein, the controller controls activation of the first switch to an ON state depending on a magnitude of the first signal. This disclosure provides improved reliability of power supply components (such as one or more switches) because such components are no longer stressed (or overstressed) due to body diode cross conduction.

23 Claims, 13 Drawing Sheets

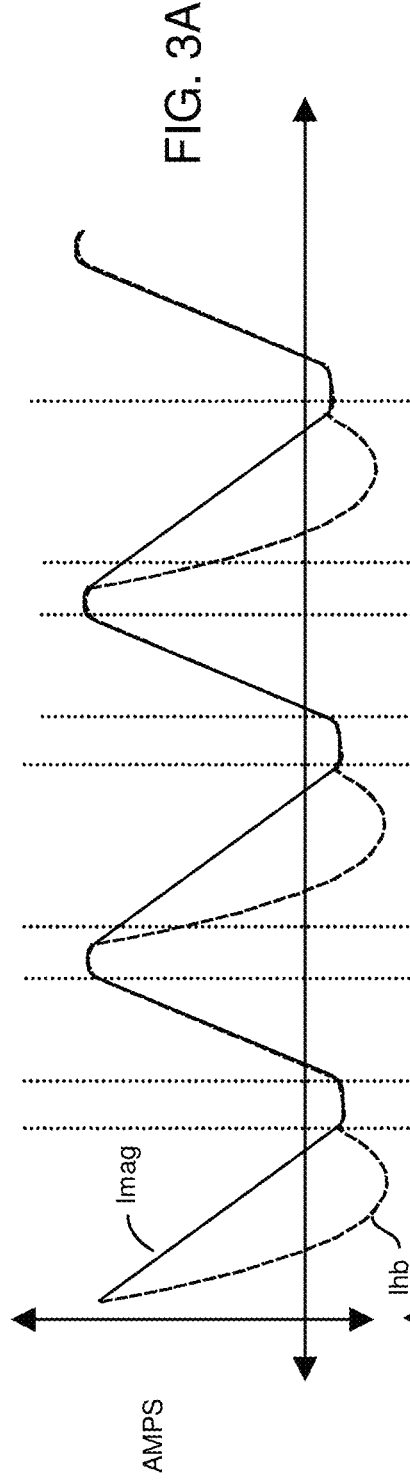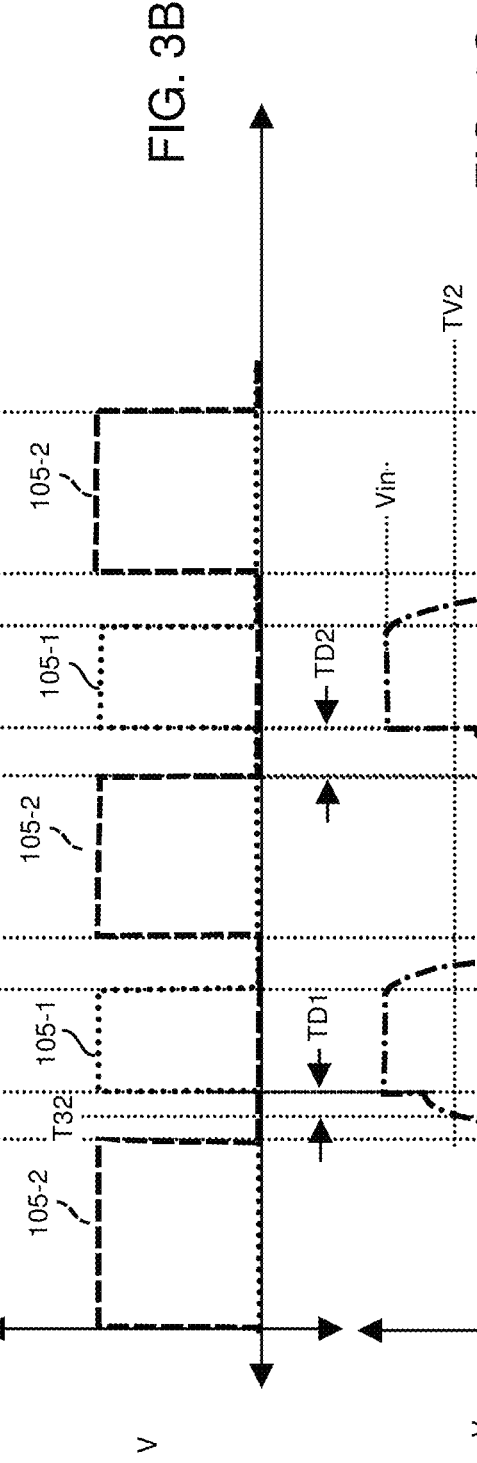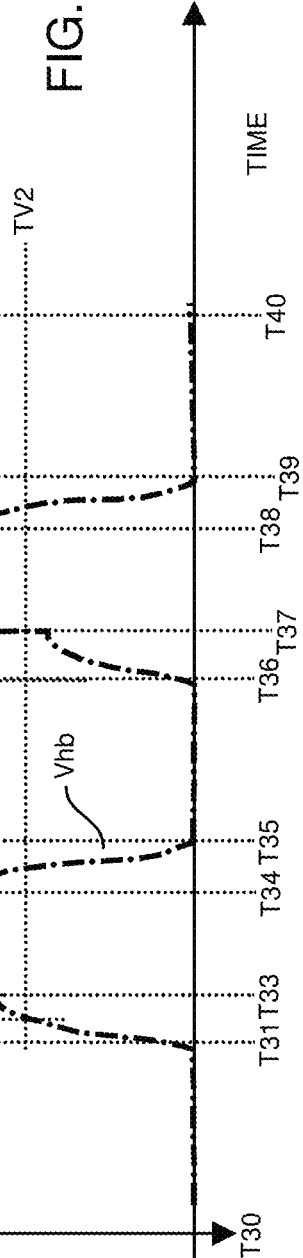

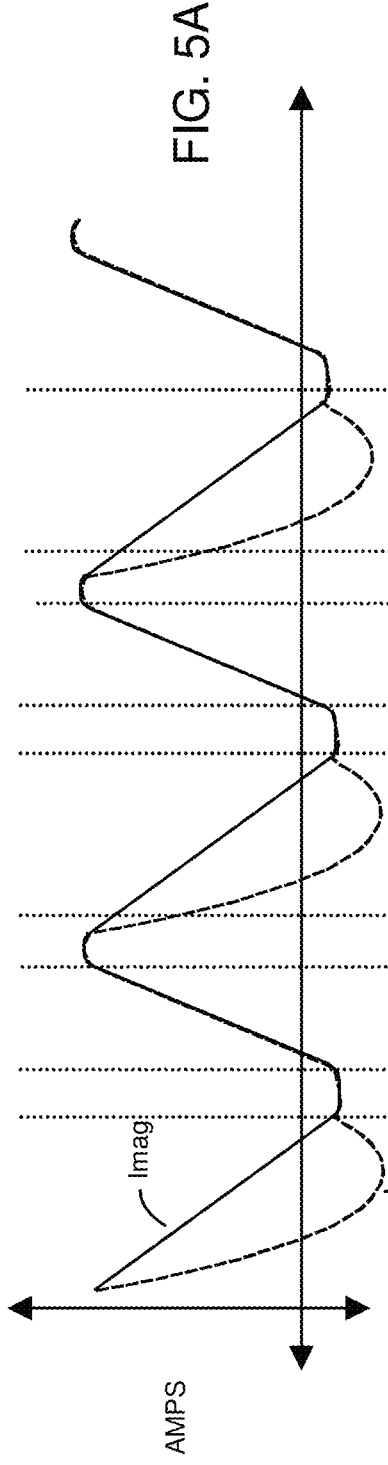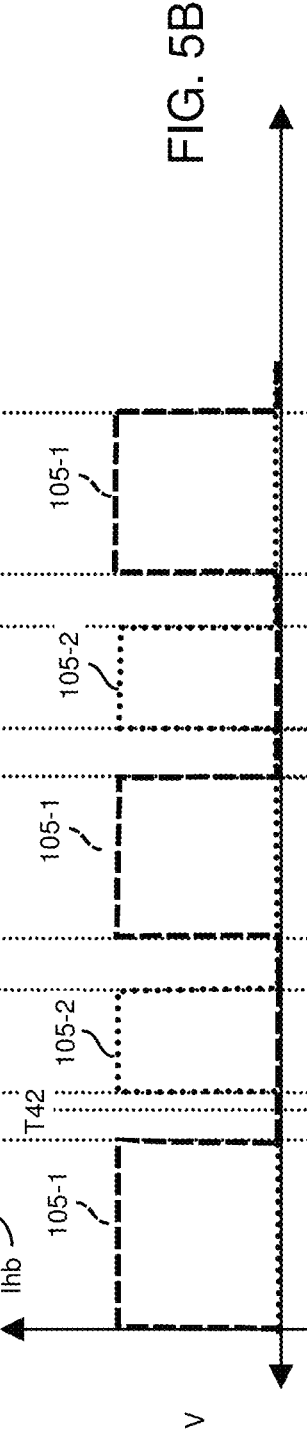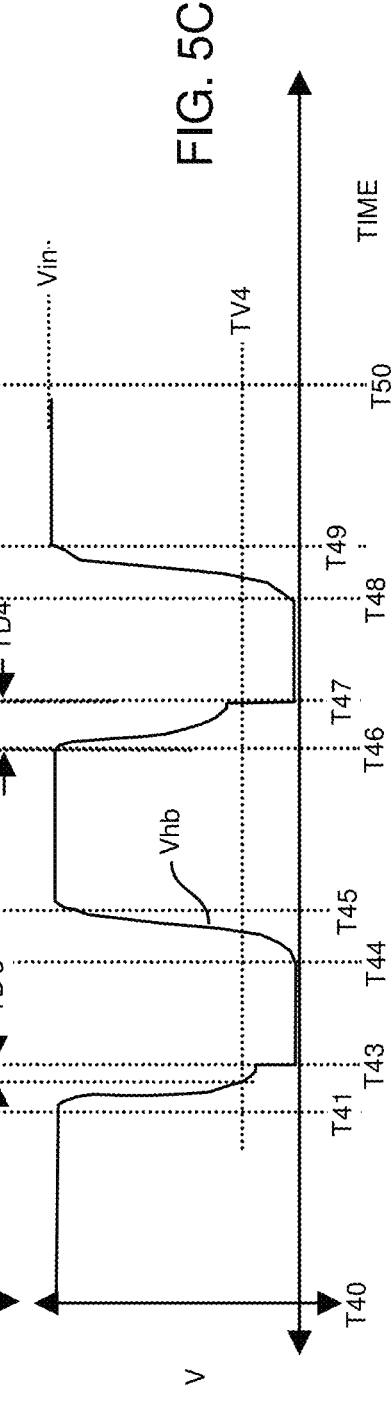

CROSS CONDUCTION PROTECTION IN A VOLTAGE CONVERTER

BACKGROUND

As its name suggests, a conventional switched-capacitor converter converts a received input voltage into an output voltage.

In one conventional application, a flyback converter receives and converts an input voltage into a respective output voltage. Typically, such flyback converters include multiple switches that are operable to couple a respective primary winding of the flyback converter to multiple different reference voltages such as an input voltage and a corresponding ground voltage to produce the output voltage.

Switches in a power converter circuit are prone to damage when switches between different reference voltages depending on a respective configuration. To avoid so-called hard switching in the flyback converter, the switches in the flyback converter are preferably switched when there is near zero voltage across them and near zero current flowing through them.

Operation of a respective conventional flyback converter can result in so-called cross conduction. For example, a conventional flyback converter can include a series connected high side switch and a low side switch coupled to a respective winding of a flyback transformer. Each of such switches can be coupled to a different reference voltage that is applied to the winding to vary an amount of current through the primary winding.

So-called cross conduction occurs in a respective power supply when i) the high side switch is simultaneously activated during a condition in which current flows through the low side switch, or more particularly, a body diode of the low-side switch, or ii) when the low side switch is simultaneously activated during a condition in which current flows through the high side switch, or more particularly, a body diode of the high-side switch.

BRIEF DESCRIPTION

This disclosure includes novel ways of providing improved performance of a voltage converter operable to generate a corresponding output voltage. For example, embodiments herein provide protection against cross conduction conditions.

More specifically, according to one embodiment, an apparatus (such as a power supply) includes one or more of a voltage converter (such as resonant power converter), a first switch, a second switch, and a controller. The controller controls switching of a first switch and a second switch to regulate conveyance of energy from a primary winding of a transformer to a secondary winding of the transformer to generate an output voltage. The primary winding and a resonant capacitor are disposed in a resonant circuit path of the resonant power converter. During control, the controller receives a first signal generated at a first node coupling the first switch and the second switch. Based on the first signal, the controller controls the timing of activation of the first switch to an ON-state.

In one embodiment, the controller delays activation of the first switch with respect to a time of detecting a trigger event associated with the first signal.

In further example embodiments, a magnitude of the first signal as measured during an OFF state of the first switch and an OFF-state of the second switch indicates whether current flows through a body diode of the second switch.

Further example embodiments herein include, via the controller, receiving a second signal indicative of a voltage (such as Vcr) associated with the resonant capacitor disposed in series with the primary winding. The controller generates the threshold value as a function of the second signal. The controller further controls activation of the first switch to the ON state based on a comparison of the first signal with respect to the threshold value. In one embodiment, the controller delays controlling activation of the first switch to the ON state with respect to a trigger event of detecting that a magnitude of the first signal crosses the threshold value.

In still further example embodiments, the controller receives a second signal from an auxiliary winding magnetically coupled to the primary winding of the transformer. The controller then generates a threshold value as a function of the second signal. Based on a comparison of the first signal with respect to the threshold value, the controller controls activation of the first switch to the ON-state. In one embodiment, the controller delays controlling activation of the first switch to the ON state with respect to a trigger event of detecting that a magnitude of the first signal crosses the threshold value.

In still further example embodiments, the controller is further operable to initiate activation of the first switch to the ON-state after a predetermined time delay with respect to detecting a condition in which the second switch transitions from an ON-state to an OFF-state.

Additionally, or alternatively, the controller initiates activation of the first switch to the ON-state after a predetermined time delay with respect to detecting a condition in which a magnitude of the received first signal crosses a threshold value.

Yet further embodiments herein include, via the controller, controlling activation of the first switch to an ON state based at least in part on a difference between a magnitude of the first signal and a magnitude of an input voltage converted by the controlled switching into the output voltage.

Note that the voltage converter as described herein is any suitable type of power supply or power converter. For example, in one embodiment, the voltage converter takes the form of an asymmetrical half bridge flyback voltage converter. Alternatively, the voltage converter takes the form of a symmetrical half bridge flyback voltage converter or other suitable type of power supply.

Accordingly, embodiments herein include different ways of providing body diode cross conduction protection in a power converter.

Embodiments herein are useful over conventional techniques. For example, in contrast to conventional techniques, the controller and corresponding control methods as described herein provide novel voltage monitoring of one or more nodes of a power converter with respect to conventional techniques. Such embodiments provide improved reliability of components (such as one or more switches) because they are no longer stressed (or overstressed) due to body diode cross conduction.

These and other more specific embodiments are disclosed in more detail below.

In addition to potentially being implemented as an analog controller and corresponding analog circuitry/components as described herein, note that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate generation of an output voltage to power a load and prevention of cross conduction in a power supply. The instructions, when executed by computer processor hardware, cause the computer processor hardware to: control switching of a first switch and a second switch in a resonant power converter to regulate conveyance of energy from a primary winding of a transformer in the resonant power converter to a secondary winding of the transformer to generate an output voltage that powers a load, the primary winding and a resonant capacitor disposed in a resonant circuit path of the resonant power converter; receive a first signal generated from a first node coupling the first switch and the second switch; and control activation of the first switch to an on state based on the first signal, the controlled activation including delaying activation of the first switch with respect to a time of detecting a trigger event.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to controlling switches in a power supply operable to generate an output voltage, the concepts disclosed herein may be advantageously applied to any other suitable voltage converter topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

BRIEF DESCRIPTION OF THE DRAWINGS

FIGS. 3A, 3B, and 3C are example timing diagrams illustrating implementation of signal monitoring and switch control in a power converter to prevent cross conduction in the power supply of FIG. 2 according to embodiments herein.

FIGS. 5A, 5B, and 5C are example timing diagrams illustrating implementation of signal monitoring and switch control in a power converter to prevent cross conduction in the power supply of FIG. 4 according to embodiments herein.

Figure 1:
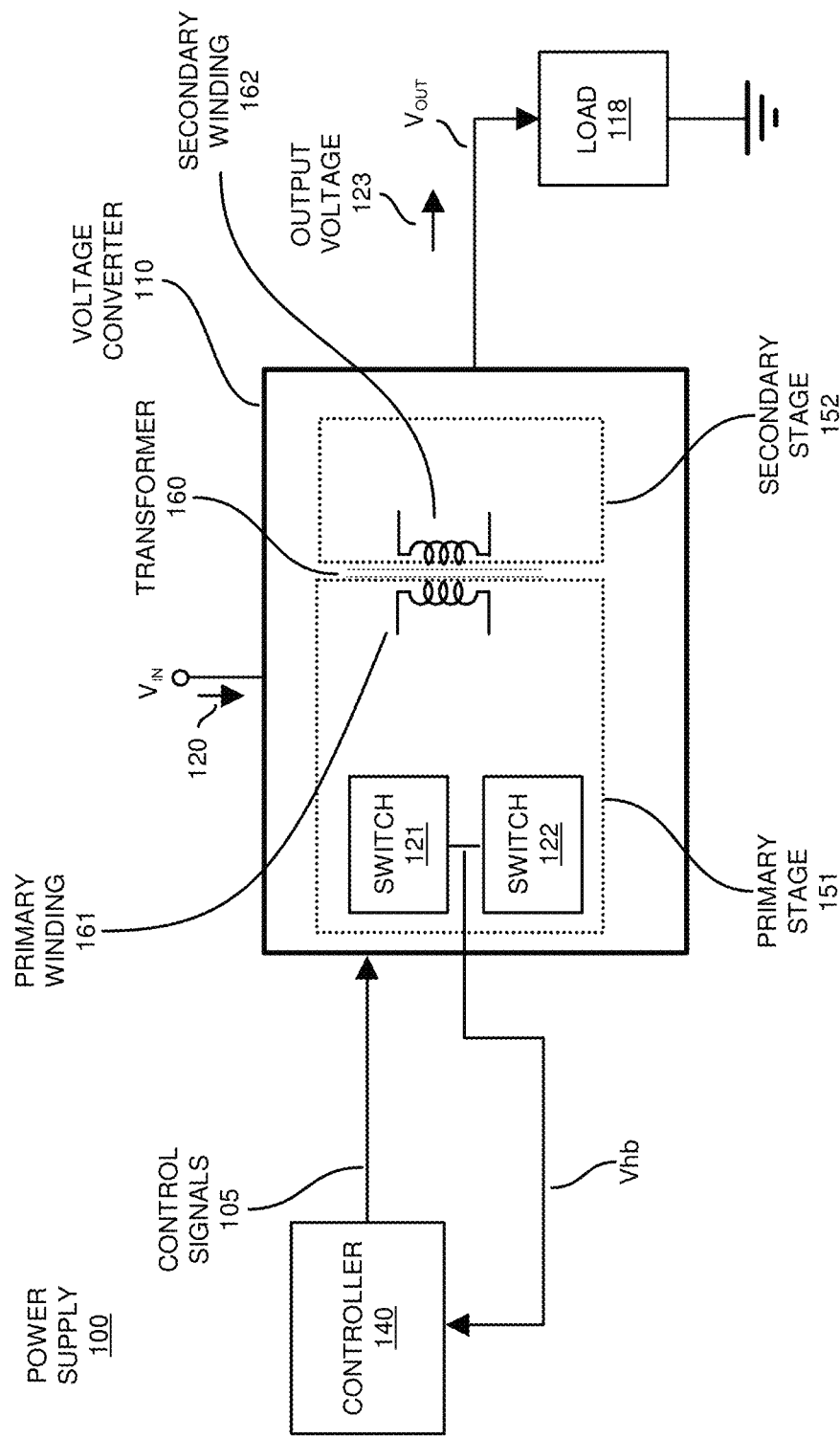
FIG. 1 is an example general diagram illustrating a power supply according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include implementation of body diode cross conduction protection in a voltage converter in any number of multiple different ways.

Now, more specifically, FIG. 1 is an example diagram illustrating a power supply according to embodiments herein.

As shown in this example embodiment, power supply 100 (such as an apparatus, electronic device, resonant power converter, etc.) includes a controller 140 and voltage converter 110. Voltage converter 110 (such as a resonant power converter) includes switch 121, switch 122, transformer 160, etc. Transformer 160 includes primary winding 161 and secondary winding 162.

Primary stage 151 of the voltage converter 110 includes switch 121, switch 122, as well as primary winding 161. Secondary stage 152 includes secondary winding 162 and corresponding circuitry to generate the output voltage 123 that powers the load 118.

Note that each of the resources as described herein can be instantiated in any suitable manner. For example, each of the controller 140 and voltage converter 110, etc., in power supply 100 can be instantiated as or include hardware (such as circuitry), software (executed instructions), or a combination of hardware and software resources.

During operation, controller 110 produces one or more control signals 105 (such as one or more pulse width modulation signals) that control states of respective control switches 121 and 122 in the voltage converter 110 to produce the output voltage 123.

Note that switches 121 and 122 can be any suitable type of components. For example, each of the switches 121 and 122 may be a field effect transistor, bipolar junction transistor, etc.

As further shown, the voltage converter 110 receives the input voltage 120 (Vin, such as a DC input voltage). As previously discussed, transformer 160 includes a primary winding 161 and a secondary winding 162. The secondary winding 162 is inductively or magnetically coupled to the primary winding 161 to receive energy provided by the input voltage 120. For example, control of current through the primary winding 161 stores energy in the primary winding 161. The stored energy transfers from the primary winding 161 to the secondary winding 162 to produce the output voltage 123.

As further discussed herein, controller 140 of the power supply 100 controllably switches the switches 121 and 122 in a respective circuit path including the primary winding 161 of transformer 160 to convey energy to the secondary winding 152. Switches 121 and 122 may be connected in series. The switching of switches 121 and 122 causes a change in a magnitude of current flowing through the primary winding. The secondary stage 152 of the voltage converter 110 converts the received energy from the primary winding 161 into the output voltage 123 that powers the load 118.

In accordance with further embodiments, voltage converter 110 generates signal Vhb (a.k.a., voltage VHb). As further discussed herein, the controller 140 uses the detected state of signal Vhb to control operation of the switches.

As previously discussed, during switching operation, the secondary winding 162 is operable to receive energy from the primary winding 161 to produce the output voltage 123 to power the load 123. For example, the controller 140 controls switching operation of the first switch 121 and the second switch 122 to control a flow of current through the primary winding 161 to generate the output voltage 123 from the secondary winding 162.

Note that the voltage converter 110 as described herein is any suitable type of power supply or power converter. For example, in one embodiment, the voltage converter 110 takes the form of an asymmetrical half bridge flyback voltage converter. Alternatively, the voltage converter 110 takes the form of a symmetrical half bridge flyback voltage converter. The voltage converter 110 can be configured in any suitable manner.

Figure 2:
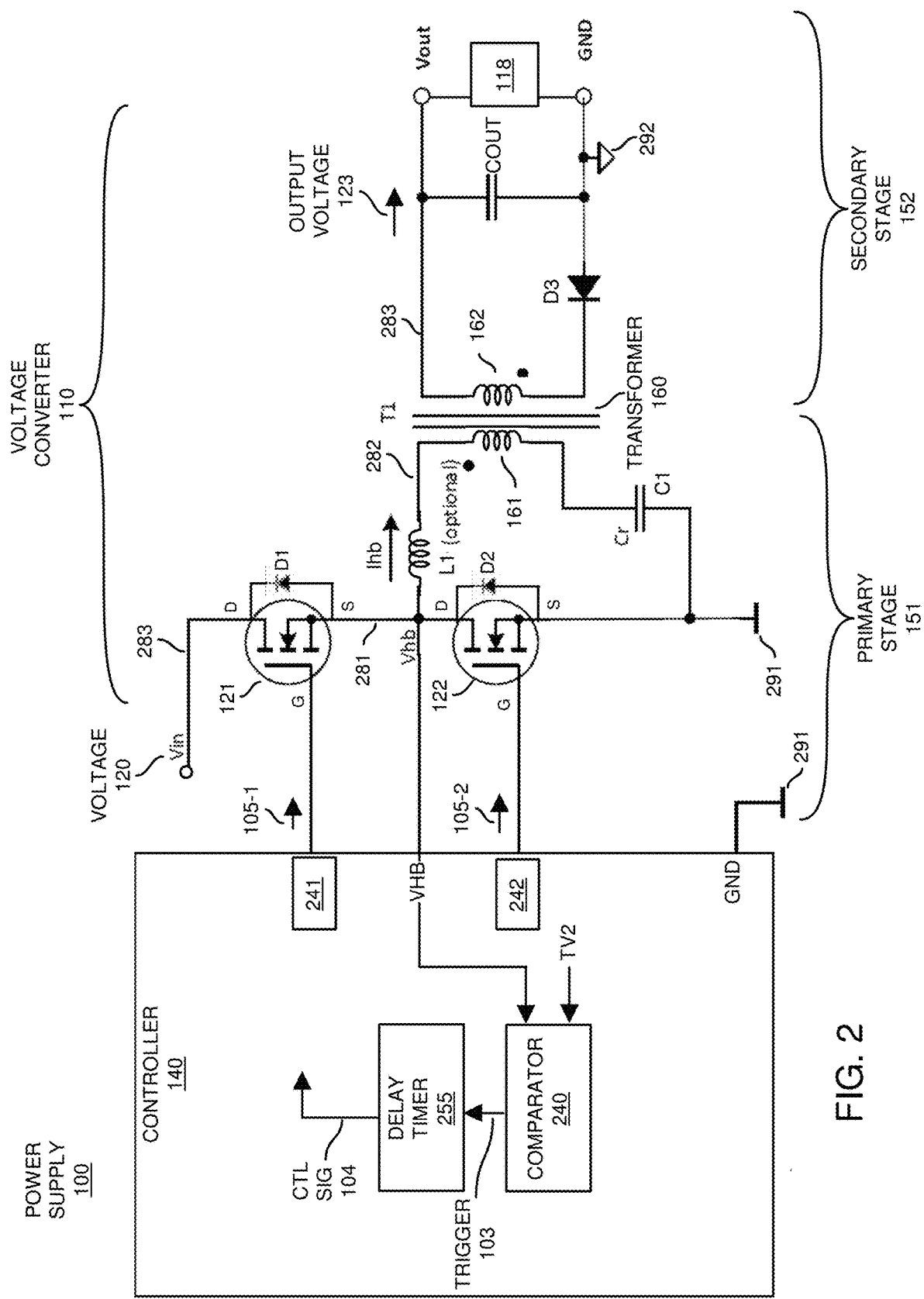
FIG. 2 is an example diagram illustrating a more detailed rendition of a power supply and corresponding controller according to embodiments herein.

FIG. 2 is a diagram illustrating a controller and a more detailed rendition of an example power supply according to embodiments herein.

In this example embodiment, the switch 121 is instantiated as a field effect transistor including a body diode D1, a gate (G), drain (D), and source (S). Additionally, the switch 122 is instantiated as a field effect transistor including a body diode D2, a gate (G), drain (D), and source (S).

Driver 241 (such as high side switch driver circuitry) of the controller 140 is electrically connected to the gate of switch 121. The drain node of the switch 121 is connected to receive the input voltage 120. At node 281, the source node of the switch 121 is connected to the drain node of switch 122. Switch 121 and switch 122 are connected in series.

Driver 242 (such as low side switch driver circuitry) of the controller 140 is electrically connected to drive the gate of switch 122. The source node of switch 122 is connected to a first ground reference potential 291.

As further shown, the body diode D1 (inherent or parasitic diode) is disposed between the source node of switch 121 and the drain node of switch 121. The body diode D2 is connected between the source node of switch 122 and the drain node of switch 122.

In accordance with further embodiments, the voltage converter 110 includes a resonant circuit path (combination of inductor L1, primary winding 161, and resonant capacitor C1) disposed between the node 281 and the ground reference potential 291. More specifically, the resonant circuit path includes a series connection of inductor L1 (optional component) connected between the node 281 and node 282 of the primary winding 161. The primary winding 161 is connected in series with the capacitor C1 between node 282 and the ground reference potential 291.

The body diode D2 (inherent or parasitic diode) of switch 122 is disposed between the source node of switch 122 and the drain node of switch 122.

As further shown, the secondary winding 162 is connected between node 283 and the diode D3. The combination of secondary winding 162 and diode D3 are connected in series between node 283 and the second ground reference potential 292.

Capacitor Cout is connected between node 283 and the second ground reference potential 292.

As previously discussed, the primary winding 161 of the transformer 160 is disposed in a resonant circuit path such as the circuit path including a combination of the inductor L1, primary winding 161, and the capacitor C1 (a.k.a., Cr). The controller 140 controls a magnitude of the switching frequency associated with the control signals 105 at or around the resonant frequency associated with the resonant circuit path.

Activation of the switch 121 to an ON state (while the switch 122 is set to an OFF state) stores energy received from the input voltage 120 in the resonant circuit path as well as conveys energy from the primary winding 161 to the secondary winding 162. Activation of the switch 122 to an ON state (while the switch 121 is set to an OFF state) dissipates energy stored in the resonant circuit path through the primary winding 161 to the secondary winding 162.

As previously discussed, the node 281 feeds voltage Vhb (a.k.a., feedback signal Vhb) to the controller 140. As further shown, the controller 140 includes comparator 240. In one embodiment, during operation, comparator 240 compares a magnitude of the feedback signal Vhb to a threshold value TV2. The magnitude of the threshold value TV2 can be set to any suitable value such as between a magnitude of the reference voltage 291 and magnitude of the input voltage 120.

Based on the comparison of the feedback voltage signal Vhb to the threshold value TV2 (threshold voltage TV2), the comparator 240 produces a respective trigger signal 103, a state of which may depend upon whether the feedback voltage signal Vhb is greater or less than the threshold voltage TV2. Thus, the comparator 240 detects when the magnitude of the feedback voltage signal Vhb crosses the respective threshold voltage TV2 and produces the signal 103. Delay timer 255 receives the trigger signal 103, which serves as a basis in which to activate the delay timer 255.

As further discussed below (such as in FIGS. 3A, 3B, and 3C as well), after expiry of a time delay (such as time delay TD1) as measured by timer 255 with respect to a trigger event as indicated by trigger signal 103, the controller 140 controls the driver 241 to activate the switch 121 to an ON-state. In such an instance, upon expiry of the time delay TD1, the timer 255 outputs control signal 104, which provides a basis in which to control timing and generation of control signal 105-1 at an appropriate time with respect to control signal 105-2 such that there is no (or substantially no) cross-conduction when switch 121 is activated to an ON-state. In other words, to prevent cross conduction, as further discussed herein, the controller 140 prevents activation of switch 121 until after a condition in which the body diode D2 no longer conducts and current no longer flows through the body diode D2. This is further illustrated in FIGS. 3A, 3B, and 3C.

FIGS. 3A, 3B, and 3C are example timing diagrams illustrating implementation of signal monitoring and switch control in a power converter to prevent cross conduction according to embodiments herein.

As previously discussed, the controller 140 monitors a magnitude of the feedback voltage signal Vhb produced by node 281 coupling the switch 121 and switch 122. A magnitude of the monitored feedback voltage signal Vhb during the OFF state of the switch 122 is used as a basis to determine whether current flows through the body diode D2 of the second switch 122.

In one embodiment, the controller 140 is further operable to initiate activation of the first switch 121 after expiration of a predetermined delay amount of time TD1, which corresponds to a condition in which there is no current (such as Ihb) flowing through the body diode D2 of the switch 122. The predetermined time TD1 can be as little as no time or a predetermined amount of time greater than zero.

Note that the magnetizing current Imag represents the energy stored in the inductance of the transformer. Ihb is the current measured at the input of the primary winding of the transformer; in one embodiment, it is composed of the magnetizing current and the reflected current from the other windings (forward currents).

As further shown, FIG. 3B indicates states of control signals 105 that control switch 121 and switch.

For example, between time T30 and time T31, the controller 140 controls a state of the driver 242 and corresponding control signal 105-2 to a logic high state while driver 241 drives control signal 105-1 to a logic low state. In such an instance, the current (Imag) decreases. The magnitude of the current Ihb also decreases. Activation of the switch 122 between time T30 and T31 causes the resonant circuit path (such as inductor L1, primary winding 161, and capacitor C1) to dissipate energy in the corresponding resonant circuit path to convey energy from primary winding 161 to the secondary winding 162, which is used to generate the output voltage 123 that powers the load 118.

At time T31, the controller 140 resets the control signal 105-2 to a logic low resulting in the deactivation of the switch 122. The diode D2 of switch 122 conducts at least for a short amount of time after switch 122 is turned off at time T31. During the dead time when both of the switches 121 and 122 are in an OFF-state, after time T31, the comparator 240 compares the magnitude of the feedback voltage signal Vhb to the threshold level TV2.

In response to detecting at time or around time T32 that the magnitude of the feedback voltage signal Vhb (crosses) increases above the threshold voltage level TV2, the comparator 240 generates the trigger signal 103 (such as an edge trigger) to indicate the detected condition. Note that after voltage signal Vhb increases to a sufficient level, it is safe to turn on the switch 121 again because it is known that the current through diode D2 is zero or substantially zero. This prevents cross conduction.

As previously discussed, the trigger signal 103 (indicating that the magnitude of the signal Vhb crosses the threshold voltage TV2) causes the delay timer 255 to be activated. After expiration of the predetermined time delay TD1 measured (by the delay timer 255) with respect to time T32, the delay timer 255 changes a state of the control signal 104 (such as via falling edge) to indicate that it is time to activate the switch 121 again. In other words, after expiration of the time delay TD1 at time T32, the controller 140 activates the control signal 105-1 to a logic high state to activate the switch 121.

Thus, time window between time T31 and T33 represents a dead time in which the controller 140 sets switches 121 and 122 to OFF states (logic low). The controller 140 uses a magnitude of the feedback signal Vhb as a basis to control switch 121. Implementation of the delay TD1 with respect to the trigger 103 (at time T32) ensures that there is no current through the body diode D2 at or around time T33 when the switch 121 is activated to an on state again after time TD1. Thus, cross conduction is avoided.

Activation of the switch 121 (while switch 122 is OFF) between time duration T33 to T34 causes an increase in current Ihb through the primary winding 161 again as shown in FIG. 3A. Activation of the switch 121 between time T33 and T34 causes the resonant circuit path (inductor L1, primary winding 161, and capacitor C1) to store energy as well as convey energy from primary winding 161 to the secondary winding 162, which is used to generate the output voltage 123 that powers the load 118.

Accordingly, the controller 140 as described herein can be configured to implement a time delay TD1 between a time of detecting a condition in which the feedback voltage signal Vhb crosses a respective threshold voltage TV2 and activating the switch 121 to the ON-state to ensure that there is no current flowing through the body diode D2 when the switch 121 is activated to the on state.

Note that the time window between time T34 and T35 represents a dead time in which the controller 140 sets switches 121 and 122 to OFF states (logic low).

After time T35, in a window between time T35 and T36, the control cycle then repeats in which the controller 140 initially activates the switch 122 to an ON state at time T35 while switch 121 is turned OFF.

It should be noted that the magnitude of the feedback signal Vhb may not increase above the respective threshold value TV2 during a respective control cycle. To accommodate such conditions, and provide proper control, the controller 140 and corresponding delay timer 255 can be configured to measure a second time delay TD2 after detecting a condition in which the control signal 105-2 is set to a low state to deactivate the switch 122. More specifically, at time T36, the controller deactivates the switch 122 to an OFF-state while switch 121 is also set to the OFF-state. In a similar manner as previously discussed, the controller 140 can be configured to monitor for a condition in which a magnitude of the feedback voltage Vhb crosses the threshold value TV2. This may not happen. For example, this does not happen between time T36 and T37.

In response to detecting that the magnitude of the feedback signal Vhb does not increase above the threshold voltage TV2 within the time delay TD2, the controller 140 sets the control signal 105-1 to the logic high state to turn on the switch 121 at time T37.

Thus, embodiments herein include operations such as i) activating the switch 121 to the ON-state after a delay of TD1 with respect to detecting that the feedback signal Vhb crosses the threshold value TV2 or ii) activating the switch 121 to the ON-state in response to detecting expiration of a time delay value TD2 subsequent to the deactivating the switch 122 in a control cycle to prevent occurrence of body diode cross conduction (such as switch 121 in an on state when current flows through diode D2). Note that the controller 140 can be configured to simultaneously monitor for both of these conditions (such as signal Vhb greater than TV2 or the signal Vhb does not threshold value TV2 within the time delay TD2. If either condition occurs, the controller 140 activates the switch 121 again. More specifically, the controller 140 detects the condition i between time T31 and time T33; the controller 140 detects the condition ii between time T36 and time T37.

Figure 4:
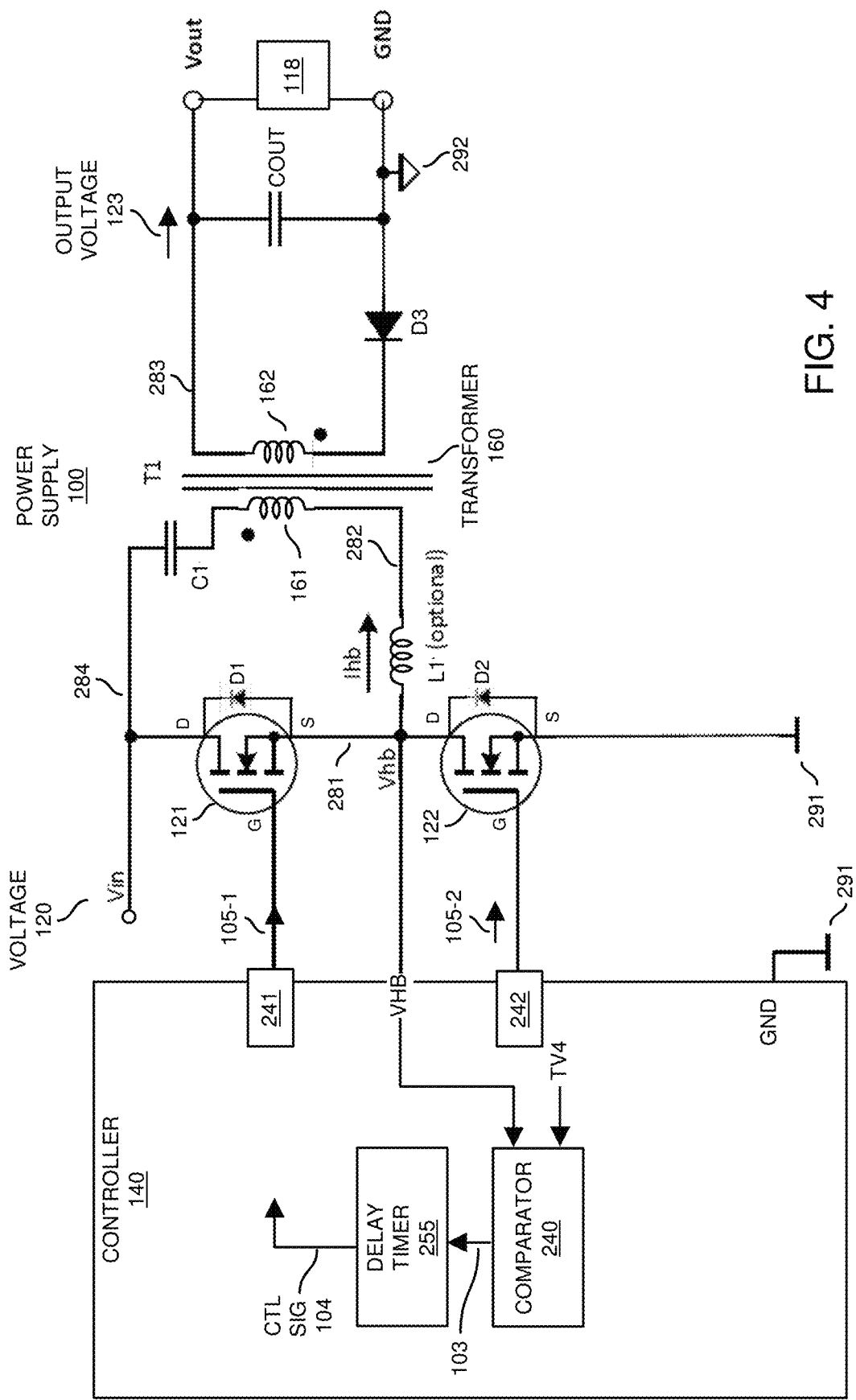
FIG. 4 is an example diagram illustrating a more detailed rendition of a power supply and corresponding controller according to embodiments herein.

FIG. 4 is an example diagram illustrating a more detailed rendition of a power supply and corresponding controller according to embodiments herein.

In this example embodiment, the switch 121 is instantiated as a field effect transistor including a body diode D1, a gate (G), drain (D), and source (S). Additionally, the switch 122 is instantiated as a field effect transistor including a body diode D2, a gate (G), drain (D), and source (S).

Driver 241 (such as high side switch driver circuitry) of the controller 140 is electrically connected to the gate of switch 121. The drain node of the switch 121 is connected to receive the input voltage 120. At node 281, the source node of the switch 121 is connected to the drain node of switch 122. Switch 121 and switch 122 are connected in series.

Driver 242 (such as low side switch driver circuitry) of the controller 140 is electrically connected to drive the gate of switch 122. The source node of switch 122 is connected to a first ground reference potential 291.

As further shown, the body diode D1 (inherent or parasitic diode) is disposed between the source node of switch 121 and the drain node of switch 121. The body diode D2 is connected between the source node of switch 122 and the drain node of switch 122.

In accordance with further embodiments, the voltage converter 110 includes a resonant circuit path (combination of inductor L1, primary winding 161, and capacitor C1) disposed between the node 281 and the node 284 (input voltage 120). More specifically, the resonant circuit path includes a series connection of inductor L1 (optional) connected between the node 281 and node 282. The primary winding 161 is connected in series with the capacitor C1 between node 282 and the node 284.

The body diode D2 (inherent or parasitic diode) of switch 122 is disposed between the source node of switch 122 and the drain node of switch 122.

As further shown, the secondary winding 162 is connected between node 283 and the diode D3. The combination of secondary winding 162 and diode D3 are connected in series between node 283 and the second ground reference potential 292.

Capacitor Cout is connected between node 283 and the second ground reference potential 292.

As previously discussed, the primary winding 161 of the transformer 160 is disposed in a resonant circuit path such as the circuit path including a combination of the inductor L1, primary winding 161, and the capacitor C1 (Cr). The controller 140 controls a magnitude of the switching frequency associated with the control signals 105 based upon the resonant frequency associated with the resonant circuit path.

Activation of the switch 122 to an ON state (while the switch 121 is set to an OFF state) stores energy received from the input voltage 120 in the resonant circuit path as well as conveys energy from the primary winding 161 to the secondary winding 162. Activation of the switch 121 to an ON state (while the switch 122 is set to an OFF state) dissipates energy stored in the resonant circuit path through the primary winding 161 to the secondary winding 162.

As previously discussed, the node 281 feeds signal Vhb (such as feedback signal Vhb) to the controller 140. As further shown, the controller 140 includes comparator 240. In one embodiment, during operation, comparator 240 compares a magnitude of the feedback signal Vhb to a threshold value TV4. The magnitude of the threshold value TV4 can be set to any suitable value such as between a magnitude of the reference voltage 291 and magnitude of the input voltage 120.

Based on the comparison of the feedback voltage signal Vhb to the threshold value TV4 (threshold voltage TV4), the comparator 240 produces a respective trigger signal 103, a state of which depends upon whether the feedback voltage signal Vhb is greater or less than the threshold voltage TV4. Thus, the comparator 240 detects when the magnitude of the feedback voltage signal Vhb crosses (such as drops below) the respective threshold voltage TV4.

Delay timer 255 receives the trigger signal 103, which serves as a basis in which to activate the delay timer 255 and measure time.

More specifically, as further discussed below (such as in FIGS. 5A, 5B, and 5C as well), after expiry of a time delay (such as time delay TD3) as measured by timer 255 with respect to a trigger event as indicated by trigger signal 103, the controller 140 controls the driver 242 to activate the switch 122 to an ON-state subsequent to a time of deactivating the second switch 121 to an OFF-state. For example, upon expiry of the time delay TD3, the timer 255 outputs control signal 104, which provides a basis in which to control timing and generation of control signal 105-2 at an appropriate time with respect to control signal 105-1 such that there is no (or substantially no) cross-conduction when switch 122 is activated to an ON-state. In other words, to prevent cross conduction, as further discussed herein, the controller 140 prevents activation of switch 122 until after a condition in which the body diode D1 no longer conducts and current no longer flows through the body diode D1. This is further illustrated in FIGS. 5A, 5B, and 5C.

FIGS. 5A, 5B, and 5C are example timing diagrams illustrating implementation of signal monitoring and switch control in a power converter to prevent cross conduction according to embodiments herein.

As previously discussed, the controller 140 monitors a magnitude of the feedback voltage signal Vhb produced by node 281 coupling the switch 121 and switch 122. A magnitude of the monitored feedback voltage signal Vhb during the OFF state of the switch 121 is used as a basis to determine whether current flows through the body diode D1 of the second switch 121.

In one embodiment, the controller 140 is further operable to initiate activation of the first switch 121 after expiration of a predetermined delay amount of time TD3, which corresponds to a condition in which there is no current (such as Ihb) flowing through the body diode D1 of the switch 121. The predetermined time TD3 can be as little as no time or a predetermined amount of time greater than zero.

As further shown, FIG. 5B indicates states of control signals 105 that control switch 121 and switch 122.

For example, between time T40 and time T41, the controller 140 controls a state of the driver 241 and corresponding control signal 105-1 to a logic high state while driver 242 drives control signal 105-2 to a logic low state. In such an instance, the current (Imag) decreases. The magnitude of the current Ihb also decreases.

At time T41, the controller 140 produces the control signal 105-1 to a logic low resulting in the deactivation of the switch 121. The diode D1 of switch 121 conducts at least for a short amount of time after it is turned off. During the dead time when both of the switches 121 and 122 are in an OFF-state, after time T41, the comparator 240 compares the magnitude of the feedback voltage signal Vhb to the threshold level TV4.

In response to detecting at or around time T42 that the magnitude of the feedback voltage signal Vhb decreases below the threshold voltage level TV4, the comparator 240 generates the trigger signal 103 (such as an edge trigger) to indicate the detected condition. Note that after voltage signal Vhb decreases to a sufficient level, it is safe to turn on the switch 122 again because it is known that the current through diode D1 zero or substantially zero.

As previously discussed, the trigger signal 103 (indicating that the magnitude of the signal Vhb crosses the threshold voltage TV4) causes the delay timer 255 to be activated. After expiration of the predetermined time delay TD3 measured (by the delay timer 255) with respect to time T42, the delay timer 255 changes a state of the control signal 104 (such as via falling edge) to indicate that it is time to activate the switch 121 again. In other words, after expiration of the time delay TD3 at time T43, the controller 140 activates the control signal 105-2 to a logic high state to activate the switch 122.

Thus, time window between time T41 and T43 represents a dead time in which the controller 140 sets switches 121 and 122 to OFF states (logic low). The controller 140 uses a magnitude of the feedback signal Vhb as a basis to control switch 122 on again. Implementation of the delay TD3 with respect to the trigger 103 (at time T42) ensures that there is no current through the body diode D1 at or around time T43 when the switch 122 is activated to an on state again after time TD3. Thus, cross conduction is avoided.

Activation of the switch 122 (while switch 121 is OFF) between time duration T43 to T44 causes an increase in current Ihb through the primary winding 161 again as shown in FIG. 5A.

Accordingly, the controller 140 as described herein can be configured to implement a time delay TD3 between a time of detecting a condition in which the feedback voltage signal Vhb crosses a respective threshold voltage TV4 and activating the switch 122 to the ON-state to ensure that there is no current flowing through the body diode D1 when the switch 122 is activated to the on state.

Note that the time window between time T44 and T45 represents a dead time in which the controller 140 sets switches 121 and 122 to OFF states (logic low).

After time T45, in a window between time T45 and T46, the control cycle then repeats in which the controller 140 initially activates the switch 121 to an ON state at time T45 while switch 122 is turned OFF.

It should be noted that the magnitude of the feedback signal Vhb may not decrease below the respective threshold value TV4 during a respective control cycle. To accommodate such a condition, the controller 140 and corresponding delay timer 255 can be configured to measure a second time delay TD4 after detecting a condition in which the control signal 105-1 is set to a low state to deactivate the switch 121. More specifically, at time T46, the controller deactivates the switch 121 to an OFF-state while switch 121 is also set to the OFF-state. In a similar manner as previously discussed, the controller 140 can be configured to monitor for a condition in which a magnitude of the feedback voltage Vhb crosses the threshold value TV4. This may not happen. For example, this does not happen between time T46 and T47.

In response to detecting that the magnitude of the feedback signal Vhb does not decrease below the threshold voltage TV4 within the time delay TD4 measured from time T46, the controller 140 sets the control signal 105-2 to the logic high state to turn on the switch 122 at time T47.

Embodiments herein include operations such as i) activating the switch 122 to the ON-state after a delay of TD3 with respect to detecting that the feedback signal Vhb crosses the threshold value TV4 or condition ii) activating the switch 122 to the ON-state in response to detecting expiration of a time delay value TD4 subsequent to the deactivating the switch 121 in a control cycle. These operations prevent occurrence of body diode cross conduction (such as switch 122 in an on state when current flows through diode D1). Note that the controller 140 can be configured to simultaneously monitor for both of these conditions. If either condition i or ii occurs, the controller 140 activates the switch 122 again. More specifically, the controller 140 detects the condition i between time T41 and time T43; the controller 140 detects the condition ii between time T46 and time T47 to activate the switch 122.

Figure 6:
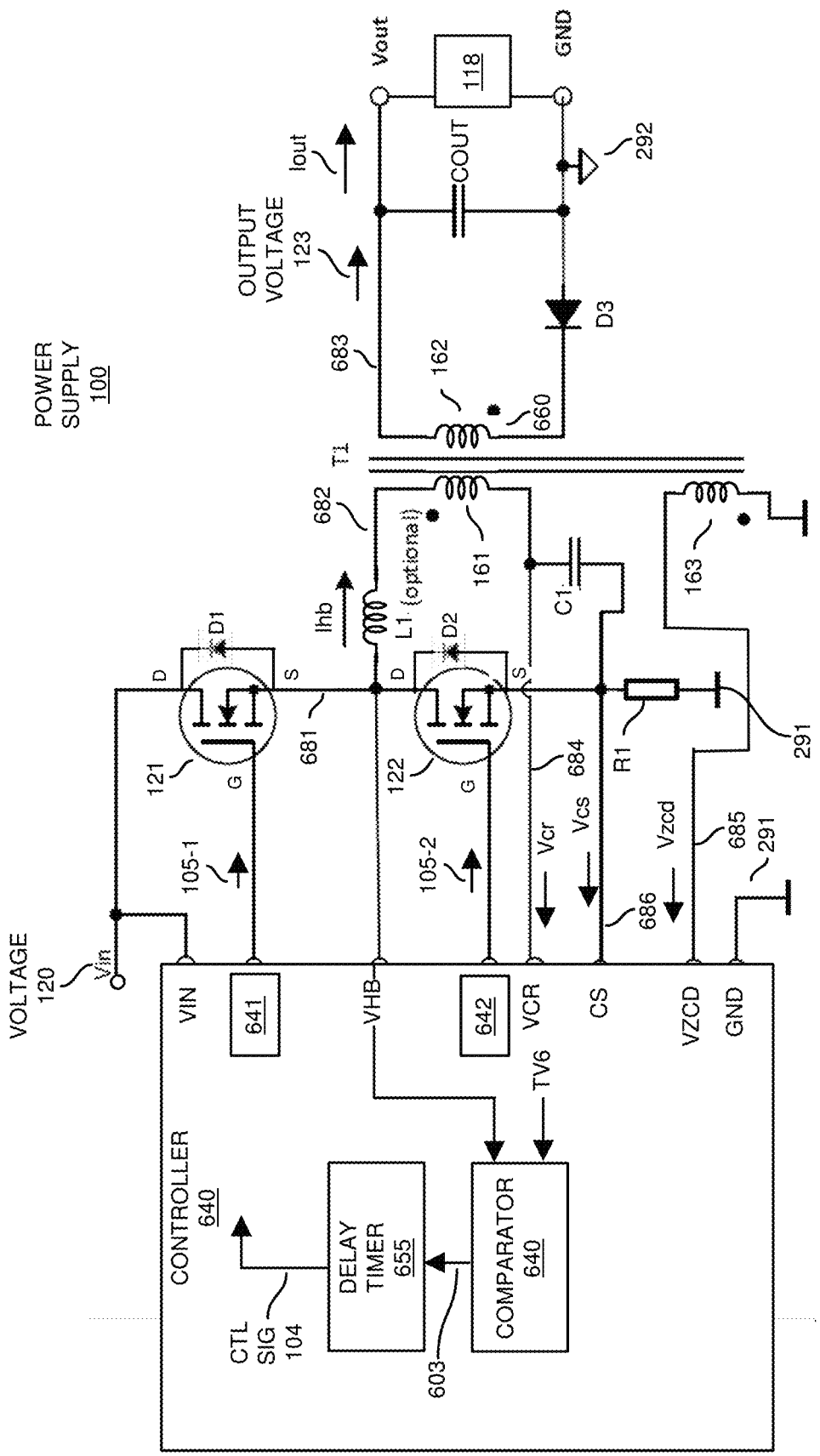
FIG. 6 is an example diagram illustrating a more detailed rendition of a power supply and corresponding controller according to embodiments herein.

FIG. 6 is an example diagram illustrating a more detailed rendition of a power supply and corresponding controller according to embodiments herein.

In this example of the power supply 100 (a.k.a., resonant power converter), the power supply 100 includes controller 640, switch 121, switch 122, inductor L1, transformer 160, capacitor C1, resistor R1, diode D3, and capacitor Cout. The transformer 660 includes primary winding 161, secondary winding 162, and auxiliary winding 163.

Each of the windings in the transformer 660 is magnetically coupled to each other. For example, the primary winding 161, secondary winding 162, and the auxiliary winding 163 are magnetically or inductively coupled to each other.

In this example embodiment of the power supply 100, the switch 121 is instantiated as a field effect transistor including a body diode D1, a gate (G), drain (D), and source (S). Additionally, the switch 122 is instantiated as a field effect transistor including a body diode D2, a gate (G), drain (D), and source (S).

Driver 641 (such as high side switch driver circuitry) of the controller 640 is electrically connected to the gate of switch 121. The drain node of the switch 121 is connected to receive the input voltage 120. At node 681, the source node of the switch 121 is connected to the drain node of switch 122. Switch 121 and switch 122 are connected in series.

Driver 642 (such as low side switch driver circuitry) of the controller 640 is electrically connected to drive the gate of switch 122. The source node of switch 122 is connected to a first ground reference potential 291.

As further shown, the body diode D1 (inherent or parasitic diode) is disposed between the source node of switch 121 and the drain node of switch 121. The body diode D2 is connected between the source node of switch 122 and the drain node of switch 122.

In accordance with further embodiments, the voltage converter 110 includes a resonant circuit path (combination of inductor L1, primary winding 161, capacitor C1, and resistor R1) disposed between the node 681 and the ground reference potential 291. More specifically, the resonant circuit path includes a series connection of inductor L1 (optional) connected between the node 681 and node 682 of the primary winding 161. The primary winding 161 is connected in series with the capacitor C1 between node 686.

Node 684 provides coupling between the primary winding 161 and the capacitor C1. The voltage Vcr at node 684 is fed back to the controller 640.

Node 686 provides coupling between the resistor R1, the source node of switch 122, and capacitor C1. The voltage Vcs at node 686 is fed back to the controller 640.

The auxiliary winding 163 is connected between node 685 and the ground reference potential 291. The voltage Vzcd is fed back to the controller 640.

Note further that the body diode D2 (inherent or parasitic diode) of switch 122 is disposed between the source node of switch 122 and the drain node of switch 122.

As further shown, the secondary winding 162 is connected between node 683 and the diode D3. The combination of secondary winding 162 and diode D3 are connected in series between node 683 and the second ground reference potential 292.

Capacitor Cout is connected between node 683 and the second ground reference potential 292.

As previously discussed, the primary winding 161 of the transformer 660 is disposed in a resonant circuit path such as the circuit path including a combination of the inductor L1, primary winding 161, and the capacitor C1 (Cr). The controller 640 controls a magnitude of the switching frequency associated with the control signals 105 based upon the resonant frequency associated with the resonant circuit path.

Activation of the switch 121 to an ON state (while the switch 122 is set to an OFF state) stores energy received from the input voltage 120 in the resonant circuit path as well as conveys energy from the primary winding 161 to the secondary winding 162 and auxiliary winding 163. Activation of the switch 122 to an ON state (while the switch 121 is set to an OFF state) dissipates energy stored in the resonant circuit path through the primary winding 161 to the secondary winding 162.

The node 681 feeds voltage Vhb (such as feedback signal Vhb) to the controller 640. As further shown, the controller 640 includes comparator 640. In one embodiment, during operation, comparator 640 compares a magnitude of the feedback signal Vhb to a threshold value TV6. The magnitude of the threshold value TV6 can be set to any suitable value such as between a magnitude of the reference voltage 291 and magnitude of the input voltage 120. Additional details of selecting a magnitude of the threshold value TV6 is further discussed below with respect to FIGS. 8A, 8B, 8C, and 8D In one embodiment, the controller 640 sets the magnitude of the threshold value TV6 as a function of monitored voltage Vcr from node 684. In another example embodiment, the controller 640 sets the magnitude of the threshold value TV6 as a function of the monitored voltage Vzcd. In further example embodiments, the controller 640 sets the magnitude of the threshold value TV6 as a function of monitored voltage Vcr and monitored voltage Vzcd.

In further example embodiments, the controller 640 sets the threshold value TV6 with respect to a magnitude of the input voltage Vin. In such an instance, the controller 640 controls activation of the first switch 121 to an ON-state based at least in part on a difference between a magnitude of the signal Vhb and a magnitude of an input voltage Vin (120) converted by controlled switching (of switches 121 and 122) into the output voltage Vout.

Based on the comparison of the feedback voltage signal Vhb to the threshold value TV6 (threshold voltage TV6), the comparator 640 produces a respective trigger signal 603, a state of which depends upon whether the feedback voltage signal Vhb is greater or less than the threshold voltage TV6. Thus, the comparator 640 detects when the magnitude of the feedback voltage signal Vhb crosses the respective threshold voltage TV6.

Delay timer 655 receives the trigger signal 103, which serves as a basis in which to activate the delay timer 655 to measure an amount of time such as TD5 and/or TD6 as further discussed below.

Figure 7:
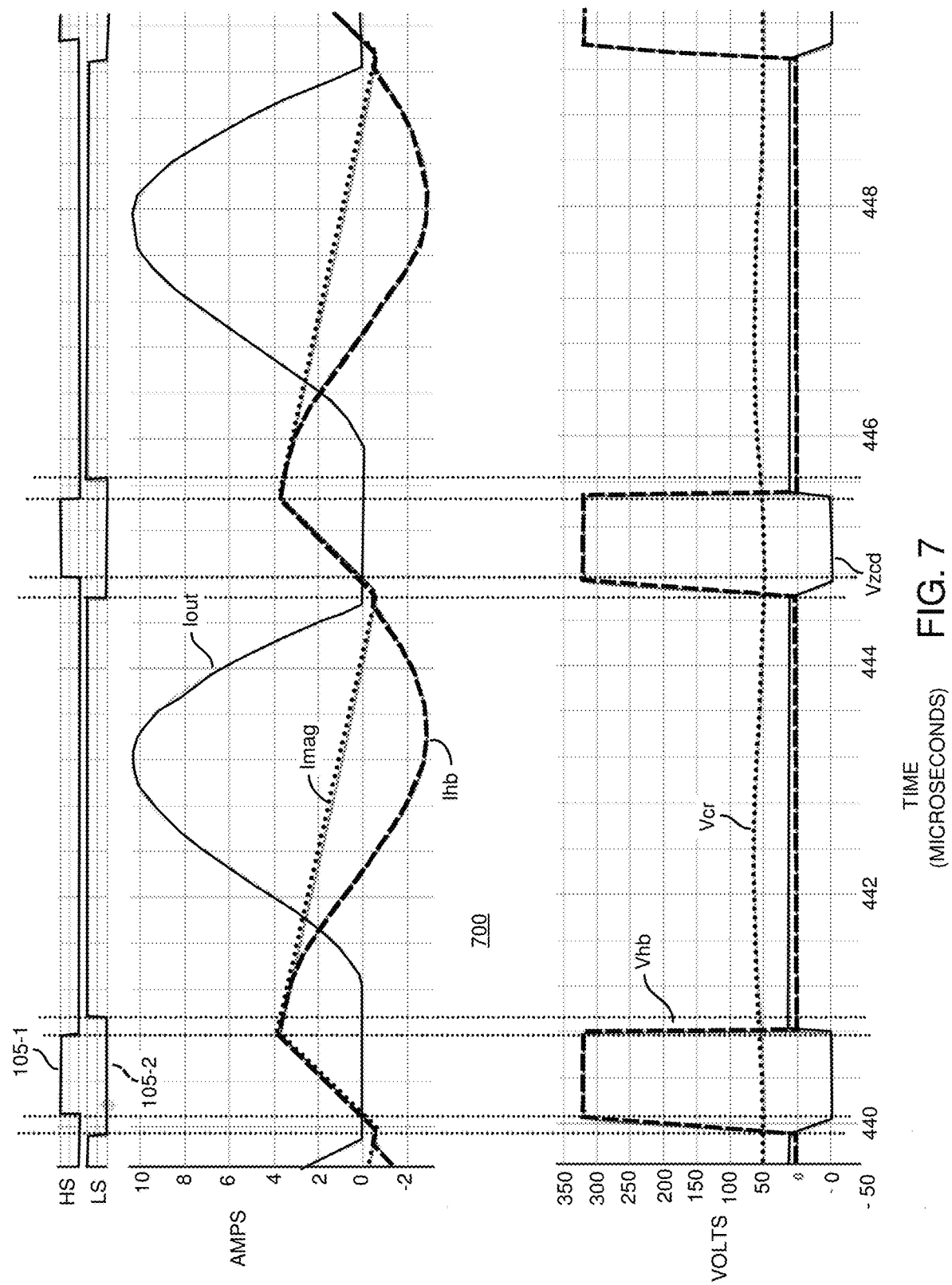
FIG. 7 is an example timing diagram illustrating control signals and corresponding monitored signals according to embodiments herein.

FIG. 7 is an example timing diagram illustrating control signals and corresponding monitor signals according to embodiments herein.

As previously discussed, the controller 640 in FIG. 6 produces the respective control signals 105 in timing diagram 700 to control switches 121 and 122. As shown, the magnitude of the signals Iout, Imag (a.k.a., magnetizing current in primary winding), Ihb, Vhb, Vcr, and Vzcd vary depending on control output switches via control signals 105.

FIGS. 8A, 8B, 8C, and 8D are example timing diagrams illustrating implementation of signal monitoring and switch control in a power converter to prevent cross conduction according to embodiments herein.

As previously discussed, the controller 640 monitors a magnitude of the feedback voltage signal Vhb produced by node 681 coupling the switch 121 and switch 122. A magnitude of the monitored feedback voltage signal Vhb during the OFF state of the switch 122 is used as a basis to determine whether current flows through the body diode D2 of the second switch 122.

In one embodiment, the controller 640 sets a magnitude of the threshold value TV6 based on one or more feedback signals (such as voltage Vcr, voltage Vcs, voltage Vzcd, etc.) For example, in one configuration, the controller 640 sets the threshold value TV6 to be equal to A*Vcr+B, where A is a chosen gain value and B is a chosen offset value. In one embodiment, the controller 640 uses one or more samples of signal Vcr in window of time W1 (between T80-1 and T80-2 such as around 50% to 75% into a range of switch 122 being ON between T80 and T81, T85 and T86, etc.) to generate the magnitude of the threshold value TV6.

Additionally, or alternatively, the controller 640 uses one or more samples of voltage Vzcd in window of time W1 (between T80-1 and T80-2 such as around 50% to 75% of switch 122 being ON between T80 and T81, T85 and T86, etc.) to generate the magnitude of the threshold value TV6. For example, the controller 640 sets the threshold value TV6 to be equal to A*Vzcd+B, where A is a chosen gain value and B is a chosen offset value.

In a further example, the controller 640 is operable to initiate activation of the first switch 121 after expiration of a predetermined delay amount of time TD5, which corresponds to a condition in which there is no current (such as Ihb) flowing through the body diode D2 of the switch 122. The predetermined time TD5 can be as little as no time or a predetermined amount of time greater than zero.

Figure 8:
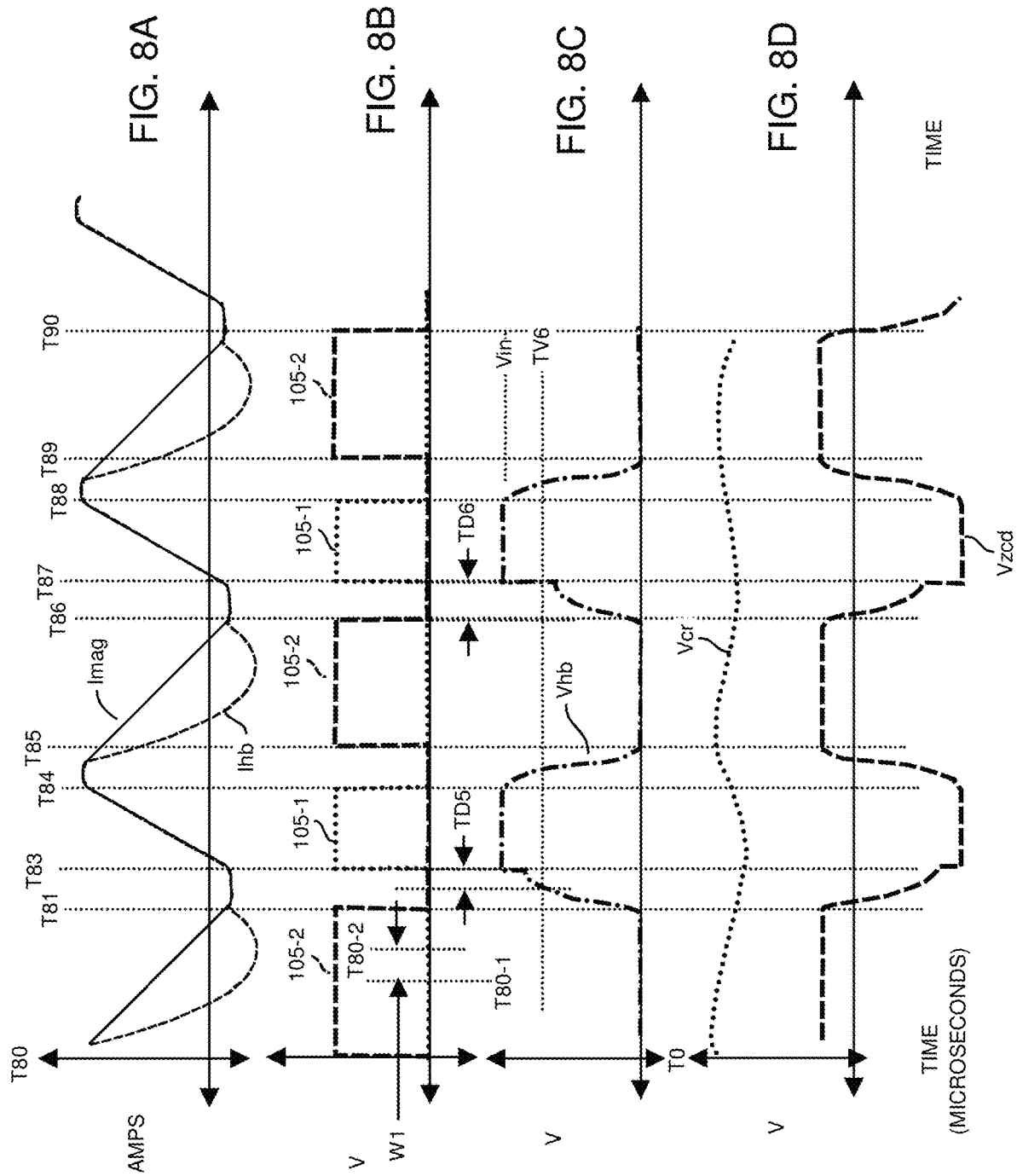
FIGS. 8A, 8B, 8C, and 8D are example timing diagrams illustrating implementation of signal monitoring and switch control in a power converter to prevent cross conduction in the power supply of FIG. 6 according to embodiments herein.

As further shown, FIG. 8B indicates states of control signals 105 that control switch 121 and switch 122.

For example, between time T80 and time T81, the controller 140 controls a state of the driver 642 and corresponding control signal 105-2 to a logic high state while driver 641 drives control signal 105-1 to a logic low state. In such an instance, the current (Imag) decreases. The magnitude of the current Ihb also decreases. Activation of the switch 122 between time T80 and T81 causes the resonant circuit path (such as inductor L1, primary winding 161, and capacitor C1) to dissipate energy in the corresponding resonant circuit path to convey energy from primary winding 161 to the secondary winding 162, which is used to generate the output voltage 123 that powers the load 118.

At time T81, the controller 140 produces the control signal 105-2 to a logic low resulting in the deactivation of the switch 122. The diode D2 of switch 122 conducts at least for a short amount of time after switch 122 is turned off. During the dead time when both of the switches 121 and 122 are in an OFF-state, after time T81, the comparator 640 compares the magnitude of the feedback voltage signal Vhb to the threshold level TV6.

In response to detecting at time or around time T82 that the magnitude of the feedback voltage signal Vhb increases above the threshold voltage level TV6, the comparator 640 generates the trigger signal 603 (such as an edge trigger) to indicate the detected condition. Note that after voltage signal Vhb increases to a sufficient level, and after time duration TD5, it is safe to turn on the switch 121 again because it is known that the current through diode D2 is zero or substantially zero.

As previously discussed, the trigger signal 603 (indicating that the magnitude of the signal Vhb crosses the threshold voltage TV6) causes the delay timer 655 to be activated. After expiration of the predetermined time delay TD5 measured (by the delay timer 655) with respect to time T82, the delay timer 655 changes a state of the control signal 104 (such as via falling edge) to indicate that it is time to activate the switch 121 again. In other words, after expiration of the time delay TD5 with respect to time T82, the controller 140 activates the control signal 105-1 to a logic high state to activate the switch 121.

Thus, time window between time T81 and T83 represents a dead time in which the controller 140 sets switches 121 and 122 to OFF states (logic low). The controller 640 uses a magnitude of the feedback signal Vhb as a basis to control switch 121. Implementation of the delay TD5 with respect to the trigger 103 (at time T82) ensures that there is substantially no current through the body diode D2 at or around time T83 when the switch 121 is activated to an on state again after time TD5. Thus, cross conduction is avoided.

Activation of the switch 121 to an ON-state (while switch 122 is OFF) between time duration T83 to T84 causes an increase in current Ihb through the primary winding 161 again as shown in FIG. 8A. Activation of the switch 121 between time T83 and T84 causes the resonant circuit path (inductor L1, primary winding 161, and capacitor C1) to store energy as well as convey energy from primary winding 161 to the secondary winding 162, which is used to generate the output voltage 123 that powers the load 118.

Accordingly, the controller 140 as described herein can be configured to implement a time delay between a time of detecting a condition in which the feedback voltage signal Vhb crosses a respective threshold voltage TV6 and activating the switch 121 to the ON-state to ensure that there is no current flowing through the body diode D2 when the switch 121 is activated to the ON-state.

Note that the time window between time T84 and T85 represents a dead time in which the controller 640 sets switches 121 and 122 to OFF states (logic low).

After time T85, in a window between time T85 and T86, the control cycle then repeats in which the controller 640 initially activates the switch 122 to an ON state at time T85 while switch 121 is turned OFF.

It should be noted that the magnitude of the feedback signal Vhb may not increase above the respective threshold value TV6 during a respective control cycle. To accommodate such condition, the controller 140 and corresponding delay timer 655 can be configured to measure a second time delay TD6 after detecting a condition in which the control signal 105-2 is reset from a high to a low state to deactivate the switch 122. More specifically, at time T86, the controller deactivates the switch 122 to an OFF-state while switch 121 is also set to the OFF-state. In a similar manner as previously discussed, the controller 140 can be configured to monitor for a condition in which a magnitude of the feedback voltage Vhb crosses the threshold value TV6. This may not happen. For example, this does not happen between time T86 and T87.

In response to detecting that the magnitude of the feedback signal Vhb does not increase above the threshold voltage TV8 within the time delay TD6, but there is an expiration of time TD6 started at time T86, the controller 140 sets the control signal 105-1 to the logic high state to turn on the switch 121 at time T87.

Note that the controller 640 can be configured to simultaneously monitor for both of the conditions as previously discussed. For example, for each of multiple control cycles (such as between time T80 and time T85, between time T85 and time T89, etc.), the controller 640 monitors for the occurrence of the voltage Vhb increasing above a respective threshold value TV6 within a time delay TD6 of the activating the low side switch 122. If the controller 640 detects this condition (Vhb>TV6), the controller 640 activates the switch 121 again after a time delay of TD5 with respect to a crossing of the voltage Vhb with respect to the threshold value TV6. If the controller 640 does not detect the voltage Vhb crossing the threshold value TV6 within time duration TD6, the controller 640 activates the switch 121 again after a time delay of TD6 with respect to the activating the switch 122 to the OFF-state.

Figure 9:
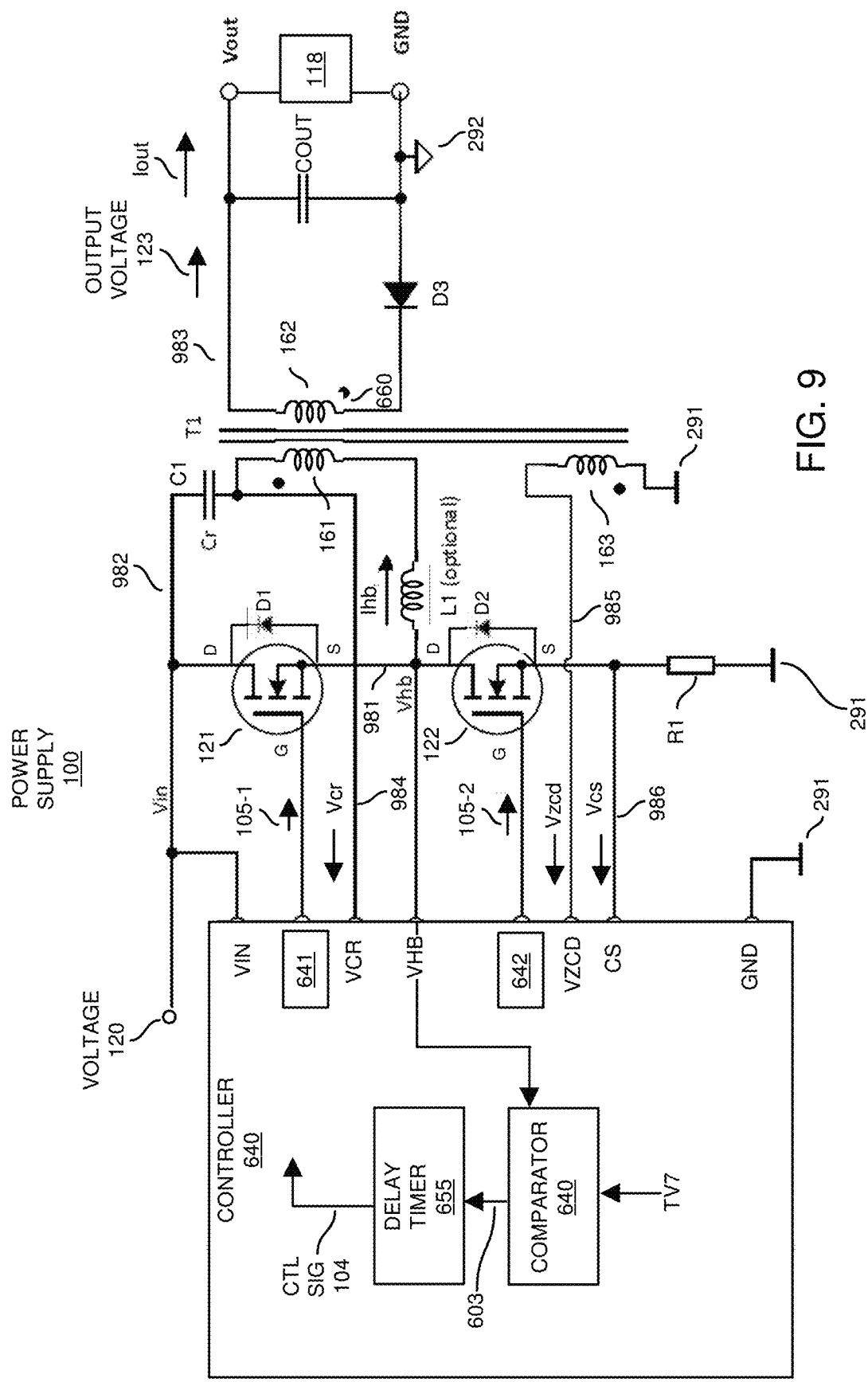
FIG. 9 is an example diagram illustrating a more detailed rendition of a power supply and corresponding controller according to embodiments herein.

FIG. 9 is an example diagram illustrating a more detailed rendition of a power supply and corresponding controller according to embodiments herein.

In this example embodiment, the switch 121 is instantiated as a field effect transistor including a body diode D1, a gate (G), drain (D), and source (S). Additionally, the switch 122 is instantiated as a field effect transistor including a body diode D2, a gate (G), drain (D), and source (S).

Driver 641 (such as high side switch driver circuitry) of the controller 640 is electrically connected to the gate of switch 121. The drain node of the switch 121 is connected to receive the input voltage 120. At node 981, the source node of the switch 121 is connected to the drain node of switch 122. Switch 121 and switch 122 are connected in series.

Driver 642 (such as low side switch driver circuitry) of the controller 640 is electrically connected to drive the gate of switch 122. The source node of switch 122 is connected to a first ground reference potential 291.

As further shown, the body diode D1 (inherent or parasitic diode) is disposed between the source node of switch 121 and the drain node of switch 121. The body diode D2 is connected between the source node of switch 122 and the drain node of switch 122.

In accordance with further embodiments, the power supply 100 includes a resonant circuit path (combination of inductor L1, primary winding 161, and capacitor C1) disposed between the node 981 and the node 982 (input voltage 120).

The body diode D2 (inherent or parasitic diode) of switch 122 is disposed between the source node of switch 122 and the drain node of switch 122.

As further shown, the secondary winding 162 is connected between node 983 and the diode D3. The combination of secondary winding 162 and diode D3 are connected in series between node 983 and the second ground reference potential 292.

Capacitor Cout is connected between node 983 and the second ground reference potential 292.

As previously discussed, the primary winding 161 of the transformer 660 is disposed in a resonant circuit path such as the circuit path including a combination of the inductor L1, primary winding 161, and the capacitor C1 (a.k.a., Cr). The controller 640 controls a magnitude of the switching frequency associated with the control signals 105 based upon the resonant frequency associated with the resonant circuit path.

As previously discussed, the node 981 feeds voltage Vhb (such as feedback signal Vhb) to the controller 640. As further shown, the controller 640 includes comparator 640. In one embodiment, during operation, comparator 640 compares a magnitude of the feedback signal Vhb to a threshold value TV7. The magnitude of the threshold value TV7 can be set to any suitable value such as between a magnitude of the reference voltage 291 and magnitude of the input voltage 120.

Additional details of selecting a magnitude of the threshold value TV7 is further discussed below with respect to FIGS. 11A, 11B, 11C, and 11D In one embodiment, the controller 640 sets the magnitude of the threshold value TV7 as a function of monitored voltage Vcr. In another example embodiment, the controller 640 sets the magnitude of the threshold value TV7 as a function of the monitored voltage Vzcd. In further example embodiments, the controller 640 sets the magnitude of the threshold value TV7 as a function of monitored voltage Vcr and monitored voltage Vzcd.

Based on the comparison of the feedback voltage signal Vhb to the threshold value TV7, the comparator 640 produces a respective trigger signal 603, a state of which depends upon whether the feedback voltage signal Vhb is greater or less than the threshold voltage TV7. Thus, the comparator 640 detects when the magnitude of the feedback voltage signal Vhb crosses the respective threshold voltage TV7. If desired, the threshold value TV7 can be selected as a function input voltage 120. The controller 640 can be configured to control activation of the switch 122 to an ON state based at least in part on a difference between a magnitude of the signal Vhb and a magnitude of an input voltage 120 converted by controlled switching of switches 121 and 122 into the output voltage 123.

Delay timer 655 receives the trigger signal 603, which serves as a basis in which to activate the delay timer 655 and measure time.

More specifically, as further discussed below (such as in FIGS. 11A, 11B, 11C, and 11D), after expiry of a time delay (such as time delay TD7) as measured by timer 655 with respect to a trigger event as indicated by trigger signal 603, the controller 640 controls the driver 641 to activate the switch 121 to an ON-state subsequent to a time of deactivating the switch 121 to an OFF-state. For example, upon expiry of the time delay TD7 with respect to shutting OFF switch 121, the timer 755 outputs control signal 104, which provides a basis in which to control timing and generation of control signal 105-2 at an appropriate time with respect to control signal 105-1 such that there is no (or substantially no) cross-conduction when switch 122 is activated to an ON-state. In other words, to prevent cross conduction, as further discussed herein, the controller 140 prevents activation of switch 122 until after a condition in which the body diode D1 no longer conducts and current no longer flows through the body diode D1. This is further illustrated in FIG. 10 and FIGS. 11A, 11B, 11C, and 11D.

Figure 10:
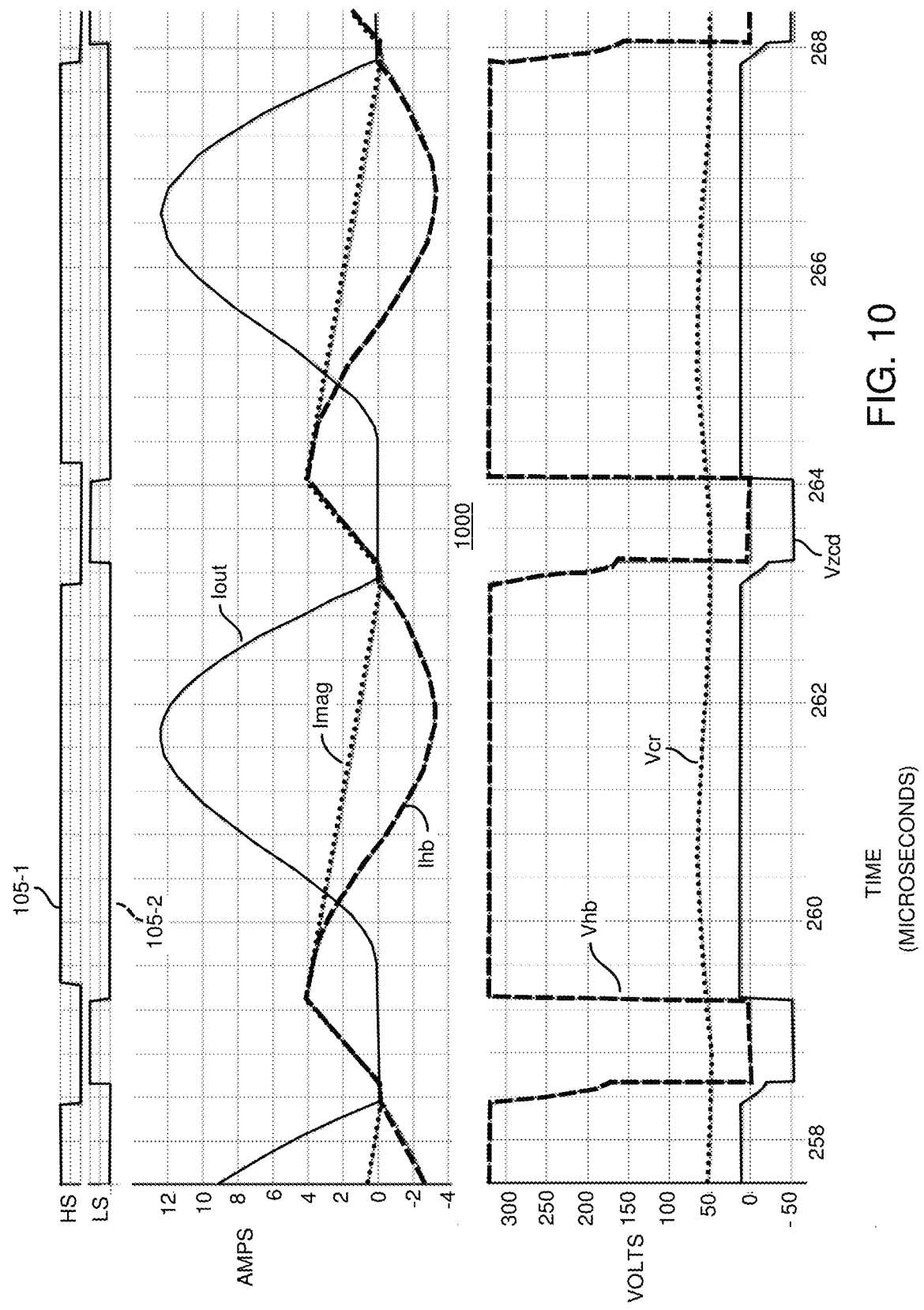
FIG. 10 is an example timing diagram illustrating control signals and corresponding monitored signals according to embodiments herein.

FIG. 10 is an example timing diagram illustrating control signals and corresponding monitor signals according to embodiments herein.

As previously discussed, the controller 640 in FIG. 9 produces the respective control signals 105 in timing diagram 1000 to control switches 121 and 122. As shown, the magnitude of the signals Iout, Imag (a.k.a., magnetizing current in primary winding), Ihb, Vhb, Vcr, and Vzcd vary depending on control output switches via control signals 105.

FIGS. 11A, 11B, 11C, and 11D are example timing diagrams illustrating implementation of signal monitoring and switch control in a power converter to prevent cross conduction according to embodiments herein.

As previously discussed, the controller 140 monitors a magnitude of the feedback voltage signal Vhb produced by node 981 coupling the switch 121 and switch 122. A magnitude of the monitored feedback voltage signal Vhb during the OFF state of the switch 122 is used as a basis to determine whether current flows through the body diode D2 of the second switch 122.

In one embodiment, the controller 640 sets a magnitude of the threshold value TV7 based on one or more feedback signals (such as voltage Vcr, voltage Vcs, voltage Vzcd, etc.)

For example, the controller 640 sets the threshold value TV7 to be equal to A*Vcr+B, where A is a chosen gain value and B is a chosen offset value. In one embodiment, the controller 640 uses one or more samples of signal Vcr in window of time W3 (between T90-1 and T90-2 such as around 50% to 75% into a range of switch 121 being ON between T80 and T81, T85 and T86, etc.) to generate the magnitude of the threshold value TV7.

Additionally, or alternatively, the controller 640 uses one or more samples of voltage Vzcd in window of time W3 (between T90-1 and T90-2 such as around 50% to 75% of switch 121 being ON between T90 and T91, T95 and T96, etc.) to generate the magnitude of the threshold value TV7. For example, the controller 640 sets the threshold value TV7 to be equal to A*Vzcd+B, where A is a chosen gain value and B is a chosen offset value.

In one embodiment, the controller 140 is further operable to initiate activation of the first switch 122 after expiration of a predetermined delay amount of time TD7, which corresponds to a condition in which there is no current (such as Ihb) flowing through the body diode D1 of the switch 121. The predetermined time TD7 can be as little as no time or a predetermined amount of time greater than zero.

Figure 11:
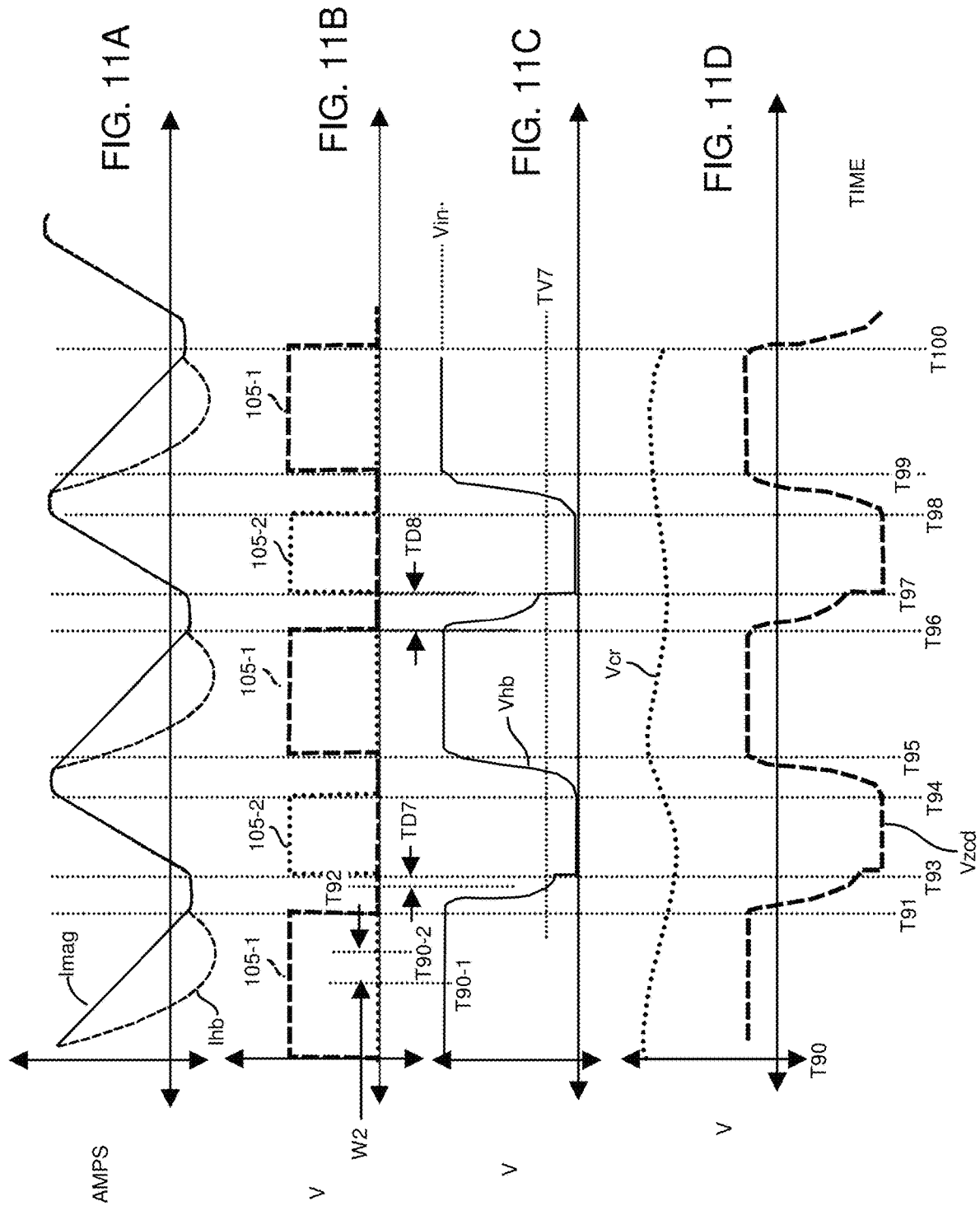
FIGS. 11A, 11B, 11C, and 11D are example timing diagrams illustrating implementation of signal monitoring and switch control in a power converter to prevent cross conduction in the power supply of FIG. 9 according to embodiments herein.

As further shown, FIG. 11B indicates states of control signals 105 that control switch 121 and switch 122.

For example, between time T90 and time T91, the controller 640 controls a state of the driver 641 and corresponding control signal 105-1 to a logic high state while driver 642 drives control signal 105-2 to a logic low state. In such an instance, the current (Imag) decreases. The magnitude of the current Ihb also decreases.

At time T91, the controller 640 produces the control signal 105-1 to a logic low resulting in the deactivation of the switch 121. The diode D1 of switch 121 conducts at least for a short amount of time after it is turned off. During the dead time when both of the switches 121 and 122 are in an OFF-state, after time T91, the comparator 640 compares the magnitude of the feedback voltage signal Vhb to the threshold level TV7.

In response to detecting at time or around time T92 that the magnitude of the feedback voltage signal Vhb decreases below the threshold voltage level TV7, the comparator 640 generates the trigger signal 103 (such as an edge trigger) to indicate the detected condition. Note that after voltage signal Vhb decreases to a sufficient level, it is safe to turn on the switch 122 again because it is known that the current through diode D1 zero or substantially zero.

As previously discussed, the trigger signal 103 (indicating that the magnitude of the signal Vhb crosses the threshold voltage TV7) causes the delay timer 655 to be activated. After expiration of the predetermined time delay TD7 measured (by the delay timer 655) with respect to time T92, the delay timer 655 changes a state of the control signal 104 (such as via falling edge) to indicate that it is time to activate the switch 122 again. In other words, after expiration of the time delay TD7 at time T93, the controller 640 activates the control signal 105-2 to a logic high state to activate the switch 122.

Thus, time window between time T91 and T93 represents a dead time in which the controller 640 sets switches 121 and 122 to OFF states (logic low). The controller 640 uses a magnitude of the feedback signal Vhb as a basis to control switch 122. Implementation of the delay TD7 with respect to the trigger 103 (at time T92) ensures that there is no current through the body diode D1 at or around time T93 when the switch 122 is activated to an on state again after time TD7. Thus, cross conduction between switch 122 being ON and current flowing through the diode D1 is avoided.

Accordingly, the controller 640 as described herein can be configured to implement a time delay TD7 between a time of detecting a condition in which the feedback voltage signal Vhb crosses a respective threshold voltage TV7 and activating the switch 122 to the ON-state to ensure that there is no current flowing through the body diode D1 when the switch 122 is activated to the on state.

Note that the time window between time T94 and T95 represents a dead time in which the controller 140 sets switches 121 and 122 to OFF states (logic low).

After time T95, in a window between time T95 and T96, the control cycle then repeats in which the controller 640 initially activates the switch 121 to an ON state at time T95 while switch 122 is turned OFF.

It should be noted that the magnitude of the feedback signal Vhb may not decrease below the respective threshold value TV7 during a respective control cycle. To accommodate such a condition, the controller 640 and corresponding delay timer 655 can be configured to measure a second time delay TD8 after detecting a condition in which the control signal 105-1 is set to a low state to deactivate the switch 121. More specifically, at time T96, the controller deactivates the switch 121 to an OFF-state while switch 122 is also set to the OFF-state. In a similar manner as previously discussed, the controller 640 can be configured to monitor for a condition in which a magnitude of the feedback voltage Vhb crosses the threshold value TV7. This may not happen. For example, this does not happen between time T96 and T97.

In response to detecting that the magnitude of the feedback signal Vhb does not decrease below the threshold voltage TV7 within the time delay TD8 with respect to time T96, the controller 140 sets the control signal 105-2 to the logic high state to turn on the switch 122 at time T97.

Note that the controller 640 can be configured to simultaneously monitor for both of the conditions as previously discussed. For example, for each of multiple control cycles (such as between time T90 and time T95, between time T95 and time T99, etc.), the controller 640 monitors for the occurrence of the voltage Vhb decreasing below a respective threshold value TV7 within a time delay TD8 of the deactivating the low side switch 121. If the controller 640 detects this condition (Vhb<TV7), the controller 640 activates the switch 121 again after a time delay of TD7 with respect to a crossing of the voltage Vhb with respect to the threshold value TV7. If the controller 640 does not detect the voltage Vhb crossing the threshold value TV7 by expiration of time TD8, the controller 640 activates the switch 122 again.

Figure 12:
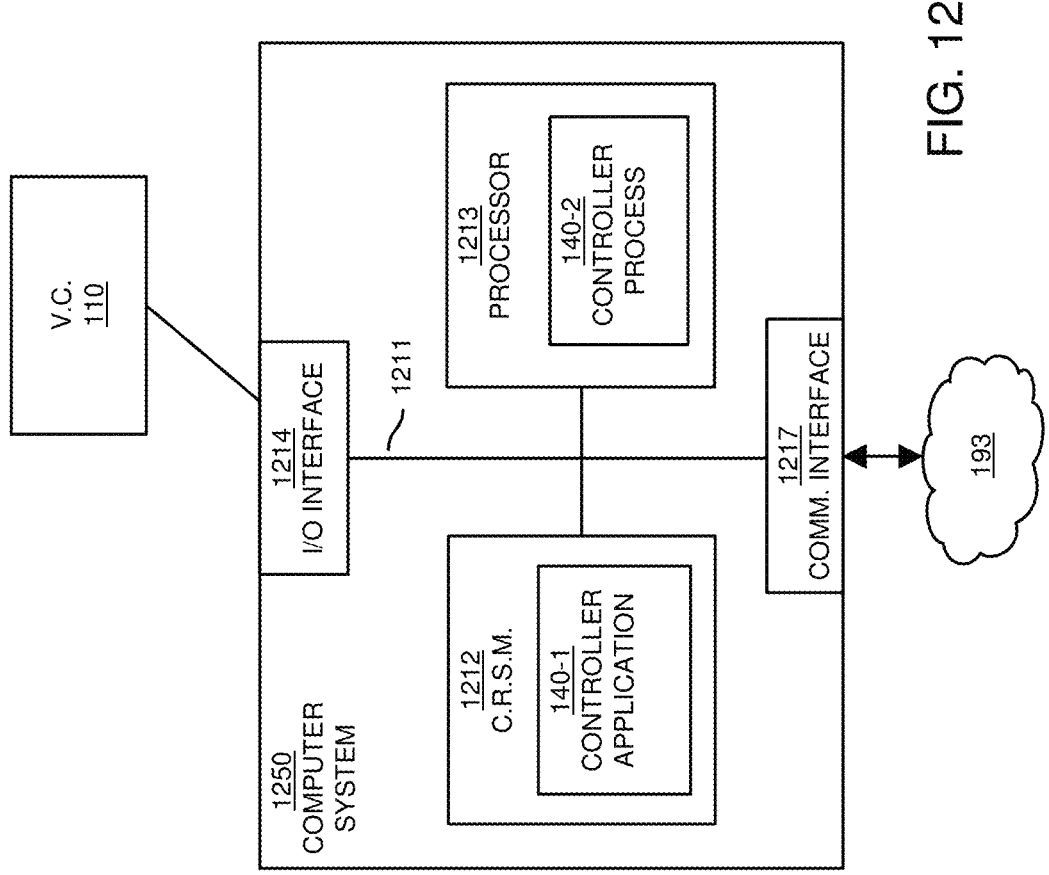
FIG. 12 is an example diagram illustrating computer architecture operable to execute one or more operations according to embodiments herein.

FIG. 12 is an example block diagram of a computer system for implementing any of the operations as previously discussed according to embodiments herein.

Any of the resources (such as controller 140, etc.) as discussed herein can be configured to include computer processor hardware and/or corresponding executable instructions to carry out the different operations as discussed herein.

As shown, computer system 1250 of the present example includes an interconnect 1211 that couples computer readable storage media 1212 such as a non-transitory type of media (which can be any suitable type of hardware storage medium in which digital information can be stored and retrieved), a processor 1213 (computer processor hardware), I/O interface 1214, and a communications interface 1217.

I/O interface(s) 1214 supports connectivity to voltage converter 110.

Computer readable storage medium 1212 can be any hardware storage device such as memory, optical storage, hard drive, floppy disk, etc. In one embodiment, the computer readable storage medium 1212 stores instructions and/or data.

As shown, computer readable storage media 1212 can be encoded with controller application 140-1 (e.g., including instructions) to carry out any of the operations as discussed herein.

During operation of one embodiment, processor 1213 accesses computer readable storage media 1212 via the use of interconnect 1211 in order to launch, run, execute, interpret or otherwise perform the instructions in controller application 140-1 stored on computer readable storage medium 1212. Execution of the controller application 140-1 produces controller process 140-2 to carry out any of the operations and/or processes as discussed herein.

Those skilled in the art will understand that the computer system 1250 can include other processes and/or software and hardware components, such as an operating system that controls allocation and use of hardware resources to execute controller application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1250 may reside at any location or can be included in any suitable resource in any network environment to implement functionality as discussed herein.

Functionality supported by the different resources will now be discussed via flowcharts in FIG. 13. Note that the steps in the flowcharts below can be executed in any suitable order.

Figure 13:
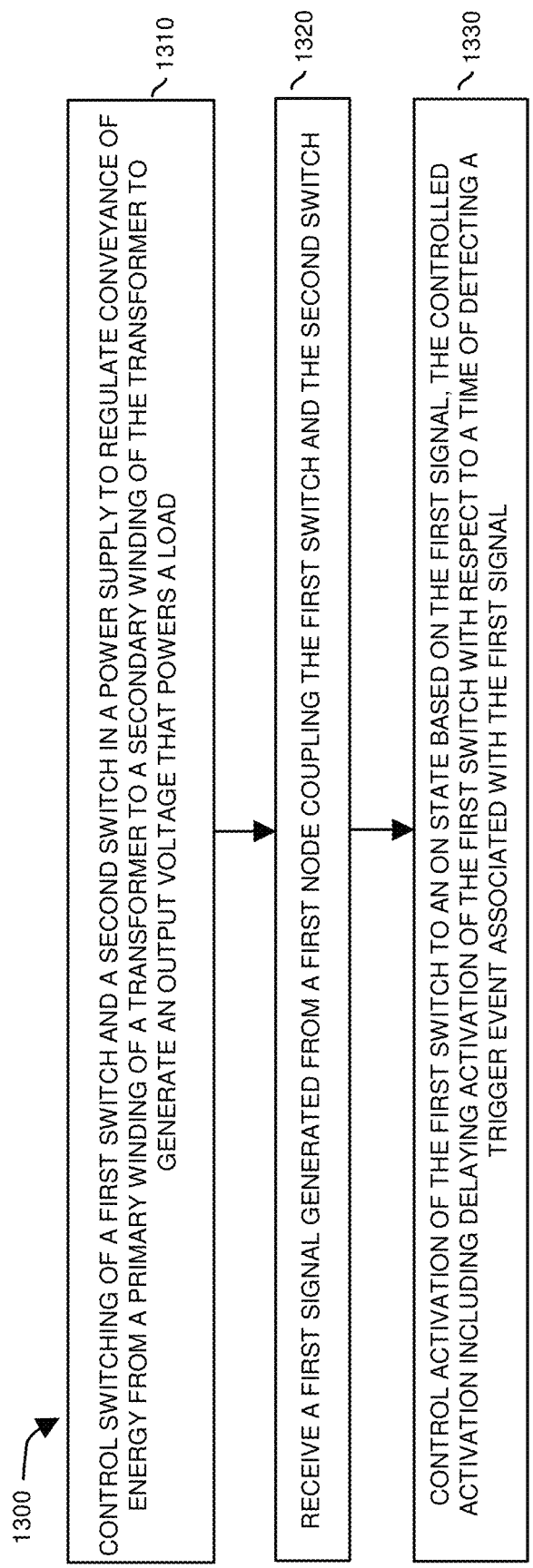
FIG. 13 is an example diagram illustrating a general method of preventing cross-conduction in a power supply according to embodiments herein.

FIG. 13 is a flowchart 1300 illustrating an example method according to embodiments herein. Note that there will be some overlap with respect to concepts as discussed above.

In processing operation 1310, the controller 140 controls switching of a first switch and a second switch in a power supply (such as a resonant power converter) to regulate conveyance of energy from a primary winding 161 of a transformer 160 in the resonant power converter to a secondary winding 162 of the transformer to generate an output voltage 123 that powers a load 118. The primary winding 161 and a resonant capacitor C1 disposed in a resonant circuit path of the resonant power converter (power supply 100).

In processing operation 1320, the controller 140 receives a first signal (Vhb) generated from a first node coupling the first switch and the second switch.

In processing operation 1330, the controller 140 controls activation of the first switch to an ON-state based at least in part on the first signal (Vhb).

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
   a controller operable to:
      control switching of a first switch and a second switch in a resonant power converter to regulate conveyance of energy from a primary winding of a transformer to a secondary winding of the transformer to generate an output voltage, the primary winding and a resonant capacitor disposed in a resonant circuit path of the resonant power converter;
      receive a first signal generated at a first node coupling the first switch and the second switch;
      control activation of the first switch to an ON state based on a trigger event associated with the first signal; and
      wherein the controller is further operable to: control activation of the first switch to the ON state based on a second signal received from an auxiliary winding magnetically coupled to the primary winding, the second signal used to detect occurrence of the trigger event associated with the first signal.

2. The apparatus as in claim 1, wherein the controller is further operable to:
   via a delay timer, delay activation of the first switch with respect to a time of detecting the trigger event associated with the first signal.

3. The apparatus as in claim 1, wherein a magnitude of the first signal, during an OFF state of the first switch and an OFF-state of the second switch, indicates a magnitude of current flowing through a body diode of the second switch.

4. The apparatus as in claim 1, wherein the controller is further operable to:
   generate a threshold value as a function of the second signal; and
   control activation of the first switch to the ON state based on a comparison of the first signal with respect to the threshold value.

5. The apparatus as in claim 4, wherein the controller is further operable to:
   delay controlling activation of the first switch to the ON state with respect to the trigger event, the trigger event being detection that a magnitude of the first signal crosses the threshold value.

6. The apparatus as in claim 1, wherein the controller is further operable to:
   delay controlling activation of the first switch to the ON state with respect to the trigger event, the trigger event being detection that a magnitude of the first signal crosses a threshold value.

7. The apparatus as in claim 1, wherein the controller is further operable to initiate activation of the first switch to the ON-state after a predetermined time delay with respect to detecting a condition in which the second switch has transitioned from an ON-state to an OFF-state.

8. The apparatus as in claim 1, wherein the trigger event is a condition in which a magnitude of the first signal is detected as crossing a threshold; and
wherein the controller is further operable to initiate activation of the first switch to the ON-state after a predetermined time delay with respect to detecting the condition in which the magnitude of the received first signal crosses the threshold value.

9. The apparatus as in claim 1, wherein the controller is further operable to:
control activation of the first switch to the ON state based at least in part on a difference between a magnitude of the first signal and a magnitude of an input voltage converted by the controlled switching into the output voltage.

10. The apparatus as in claim 1, wherein the controller is further operable to:
control activation of the first switch to the ON state based on a voltage stored in the resonant capacitor, the voltage used to detect occurrence of the trigger event associated with the first signal.

11. The apparatus as in claim 1, wherein the controller is operable to activate the first switch to the ON state in response to passage of a predetermined amount of time with respect to the trigger event as measured by a delay timer.

12. The apparatus as in claim 1, wherein the trigger event occurs subsequent to deactivation of the second switch to an OFF state and prior to the activation of the first switch to the ON state.

13. The apparatus as in claim 1, wherein the controller is further operable to:
generate a threshold level, the threshold level selected to prevent cross conduction between the first switch and the second switch; and
determine occurrence of the trigger event based upon a magnitude of the first signal crossing the threshold level.

14. The apparatus as in claim 13, wherein the threshold level corresponds to a condition in which a body diode associated with the second switch no longer conducts current after the second switch is deactivated to an OFF state.

15. The apparatus as in claim 14, wherein the trigger event of the magnitude of the first signal crossing the threshold level occurs subsequent to deactivation of the second switch to an OFF state and prior to the activation of the first switch to the ON state.

16. The apparatus in claim 1, wherein the controller is operable to implement a selected time delay of the activation of the first switch with respect to the trigger event to ensure a condition in which a body diode associated with the second switch no longer conducts current after being deactivated to an OFF-state.

17. A method comprising:
controlling switching of a first switch and a second switch in a resonant power converter to regulate conveyance of energy from a primary winding of a transformer in the resonant power converter to a secondary winding of the transformer to generate an output voltage that powers a load, the primary winding and a resonant capacitor disposed in a resonant circuit path of the resonant power converter;
receiving a first signal generated from a first node coupling the first switch and the second switch;
controlling activation of the first switch to an ON state based on the first signal, the controlled activation of the first switch including delaying activation of the first switch with respect to a time of detecting a trigger event associated with the first signal; and
the method further comprising: receiving a second signal, the second signal indicative of a voltage associated with the resonant capacitor disposed in series with the primary winding; generating a threshold value as a function of the second signal; and controlling activation of the first switch to the ON state based on a comparison of the first signal with respect to the threshold value.

18. The method as in claim 17, further comprising:
delay activation of the first switch to the ON state with respect to the trigger event of detecting that a magnitude of the first signal crosses the threshold value.

19. The method as in claim 17 further comprising:
receiving the second signal from an auxiliary winding magnetically coupled to the primary winding.

20. The method as in claim 17 further comprising:
controlling activation of the first switch to an ON-state based at least in part on a difference between a magnitude of the first signal and a magnitude of an input voltage converted by the controlled switching into the output voltage.

21. An apparatus comprising:
a controller operable to:
control switching of a first switch and a second switch in a resonant power converter to regulate conveyance of energy from a primary winding of a transformer to a secondary winding of the transformer to generate an output voltage, the primary winding and a resonant capacitor disposed in a resonant circuit path of the resonant power converter;
receive a first signal generated at a first node coupling the first switch and the second switch;
control activation of the first switch to an ON state based on a trigger event associated with the first signal; and
wherein the controller is further operable to: control activation of the first switch to the ON state based on a voltage received from a node of the resonant capacitor.

22. An apparatus comprising:
a controller operable to:
control switching of a first switch and a second switch in a resonant power converter to regulate conveyance of energy from a primary winding of a transformer to a secondary winding of the transformer to generate an output voltage, the primary winding and a resonant capacitor disposed in a resonant circuit path of the resonant power converter;
receive a first signal generated at a first node coupling the first switch and the second switch;
control activation of the first switch to an ON state based on a trigger event associated with the first signal; and
wherein the controller is further operable to measure passage of time with a delay timer in response to detecting the trigger event.

23. The apparatus as in claim 22, wherein the trigger event occurs subsequent to deactivation of the second switch to an OFF state and prior to the activation of the first switch to the ON state.

* * * * *